United States Patent
Ishido et al.

(10) Patent No.: US 6,952,290 B2
(45) Date of Patent: Oct. 4, 2005

(54) SENSING OF ORIGINAL SIZE

(75) Inventors: Katsuhiro Ishido, Ibaraki (JP); Nobuo Matsuoka, Kanagawa (JP); Akihiro Kashiwabara, Chiba (JP); Toshio Hayashi, Ibaraki (JP); Takeshi Aoyama, Chiba (JP); Tsunao Honbo, Kanagawa (JP); Noriaki Matsui, Ibaraki (JP); Satoru Kijima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 725 days.

(21) Appl. No.: 09/818,150

(22) Filed: Mar. 27, 2001

(65) Prior Publication Data

US 2001/0035987 A1 Nov. 1, 2001

(30) Foreign Application Priority Data

Mar. 30, 2000 (JP) .................................... 2000-095691

(51) Int. Cl.[7] .......................... H01L 27/00; H04N 1/04; H04N 1/40
(52) U.S. Cl. ...................... 358/475; 358/449; 358/448; 250/208.1
(58) Field of Search ............................... 358/449, 488, 358/475; 250/208.1

(56) References Cited

U.S. PATENT DOCUMENTS

| 4,816,867 A | * | 3/1989 | Ito .............................. 399/195 |
| 4,929,844 A |   | 5/1990 | Houjiyou et al. ........... 250/561 |
| 5,041,874 A | * | 8/1991 | Nishimori et al. ........... 399/203 |
| 5,225,688 A | * | 7/1993 | Endo ...................... 250/559.24 |

FOREIGN PATENT DOCUMENTS

| EP | 0525383 B1 | 1/1996 | .......... G03G/15/00 |
| JP | 1-136460 | 5/1989 | ............ H04N/1/04 |
| JP | 5-207239 | 8/1993 | ............ H04N/1/04 |
| JP | 9-329848 | 12/1997 | ............ G03B/27/62 |

* cited by examiner

Primary Examiner—Edward Coles
Assistant Examiner—Houshang Safaipour
(74) Attorney, Agent, or Firm—Morgan & Finnegan, LLP

(57) ABSTRACT

An original size sensing method for an apparatus which includes a photoelectric converter for reading an image of an original placed on a platen, and a light source for irradiating the original with light, determines the presence/absence of incidence of ambient light on the basis of an output from the photoelectric converter while the light source is kept off. When ambient light is found to be incident, the method determines the size of an original placed on the platen on the basis of that output from the photoelectric converter, which falls outside the range in which the ambient light is incident, while the light source is kept on.

20 Claims, 25 Drawing Sheets

FIG. 12

| SIZE DETERMINATION RESULT (MAIN SCAN DIRECTION) | DETERMINATION RESUL OF ORIGINAL SENSOR 113 | |
|---|---|---|
| | ORIGINAL PRESENT | ORIGINAL ABSENT |
| B5R, B6 | B5R | B6 |
| A4R, A5 | A4R | A5 |
| B5, B4 | B4 | B5 |
| A4, A3 | A3 | A4 |

SENSING OF ORIGINAL SIZE

FIELD OF THE INVENTION

The present invention relates to sensing of an original size and, more particularly, to an original size sensing apparatus and method suited to sensing the size of an original to be read by, e.g., a digital copying machine, scanner, or facsimile apparatus.

BACKGROUND OF THE INVENTION

Conventional apparatuses for sensing the size of an original to be read use various schemes. An example is a method described in Japanese Patent Laid-Open No. 5-207239. In this method, the width of an original in the main scan direction is detected by illuminating the leading edge of the original with a light source and reading the reflected light from the original by a CCD. The width of the original in the sub-scan direction is detected by an original size sensor. The original size is sensed on the basis of these two reading results. This method detects the original size by using the CCD for reading originals to obtain the width in the main scan direction. Since this reduces the number of original size sensors, it is possible to realize inexpensive and efficient automatic original sensing.

In addition, a method described in Japanese Patent Laid-Open No. 9-329848 is known. In this method, the opening/closure of a cover plate for pressing an original to be read is detected and an original size is determined when the opening of the cover plate is detected.

Unfortunately, the above conventional techniques have the following problem. That is, in the above conventional original size sensing methods, original size can be basically detected, however, there is a possibility that the original size may be miss-detected since ambient light from, e.g., a room lamp other than the apparatus may be also read when reading the reflected light from an original, and this ambient light and the reflected light from the original can not be distinguished. In particular, the technique disclosed in Japanese Patent Laid-Open No. 9-329848 does not refer to the influence of ambient light.

SUMMARY OF THE INVENTION

The present invention has been made in consideration of the above situation, and has as its object to realize efficient original size sensing insusceptible to the influence of ambient light.

According to the present invention, the foregoing object is attained by providing an original size sensing apparatus incorporated into an apparatus, or an image reading apparatus, or a copying apparatus or a facsimile apparatus which comprises a photoelectric converter for reading an image of an original placed on a platen, and a light source for irradiating the original with light, comprising: an ambient light determination unit for determining the presence/absence of incidence of ambient light on the basis of an output from the photoelectric converter while the light source is kept off; and an original size determination unit for determining, when the ambient light determination unit determines that ambient light is incident, the size of an original placed on the platen on the basis of output from the photoelectric converter except a range in which the ambient light is incident, while the light source is kept on.

According to the present invention, the foregoing object is also attained by providing an original size sensing apparatus incorporated into an apparatus, or an image reading apparatus, or a copying apparatus or a facsimile apparatus which comprises a photoelectric converter for reading an image of an original placed on a platen, and a light source for irradiating the original with light, comprising: an ambient light determination unit for determining the presence/absence of incidence of ambient light on the basis of an output from the photoelectric converter while the light source is kept off; and an original size determination unit for determining, when the ambient light determination unit determines that ambient light is incident, the size of an original placed on the platen on the basis of output from a range, of the photoelectric converter, from a boundary between a region in which the ambient light is not incident and a region in which the ambient light is incident to a predetermined position, while the light source is kept on.

Further, the foregoing object is also attained by providing an original size sensing method for an apparatus which comprises a photoelectric converter for reading an image of an original placed on a platen, and a light source for irradiating the original with light, comprising: an ambient light determination step of determining the presence/absence of incidence of ambient light on the basis of an output from the photoelectric converter while the light source is kept off; and an original size determination step of determining, when it is determined in the ambient light determination step that ambient light is incident, the size of an original placed on the platen on the basis of output from the photoelectric converter except a range in which the ambient light is incident, while the light source is kept on.

Furthermore, the foregoing object is also attained by providing An original size sensing method for an apparatus which comprises a photoelectric converter for reading an image of an original placed on a platen having an original size index plate indicating placement position references of various fixed-form originals, and a light source for irradiating the original with light, comprising: an ambient light determination step of determining the presence/absence of incidence of ambient light on the basis of an output from the photoelectric converter while the light source is kept off; and an original size determination step of determining, when it is determined in the ambient light determination step that ambient light is incident, the size of an original placed on the platen on the basis of output from a range, of the photoelectric converter, from a boundary between a region in which the ambient light is not incident and a region in which the ambient light is incident to a predetermined position, while the light source is kept on.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a view showing the main scan size determination results and the original sensor determination results in the image reading apparatuses according to the first to fourth embodiments of the present invention;

DETAILED DESCRIPTION OF THE PREFERRED EMBODIMENTS

Preferred embodiments of the present invention will be described in detail in accordance with the accompanying drawings.

[First Embodiment]

Figure 2:
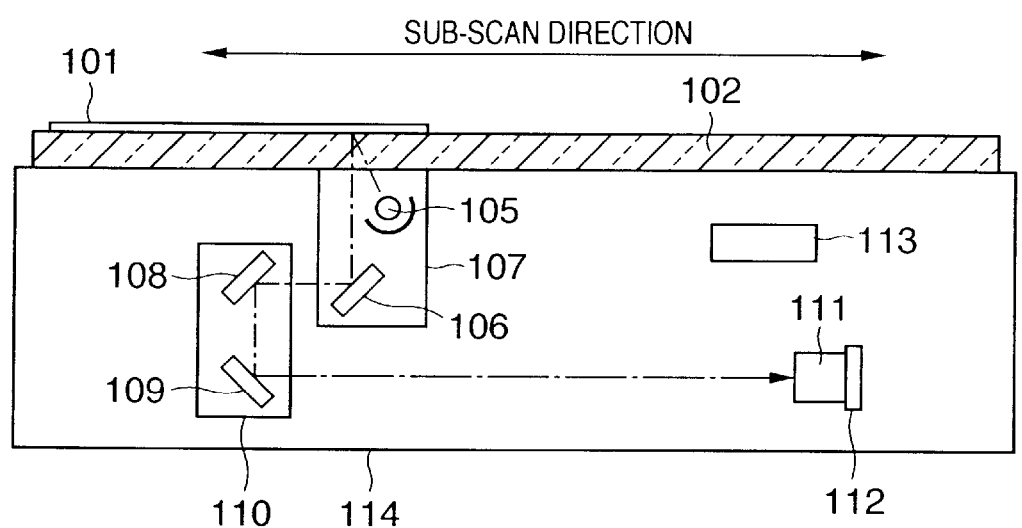
FIG. 2 is a view showing the arrangement of an image reading system of the image reading apparatuses according to the first to fourth embodiments of the present invention.
Figure 3:
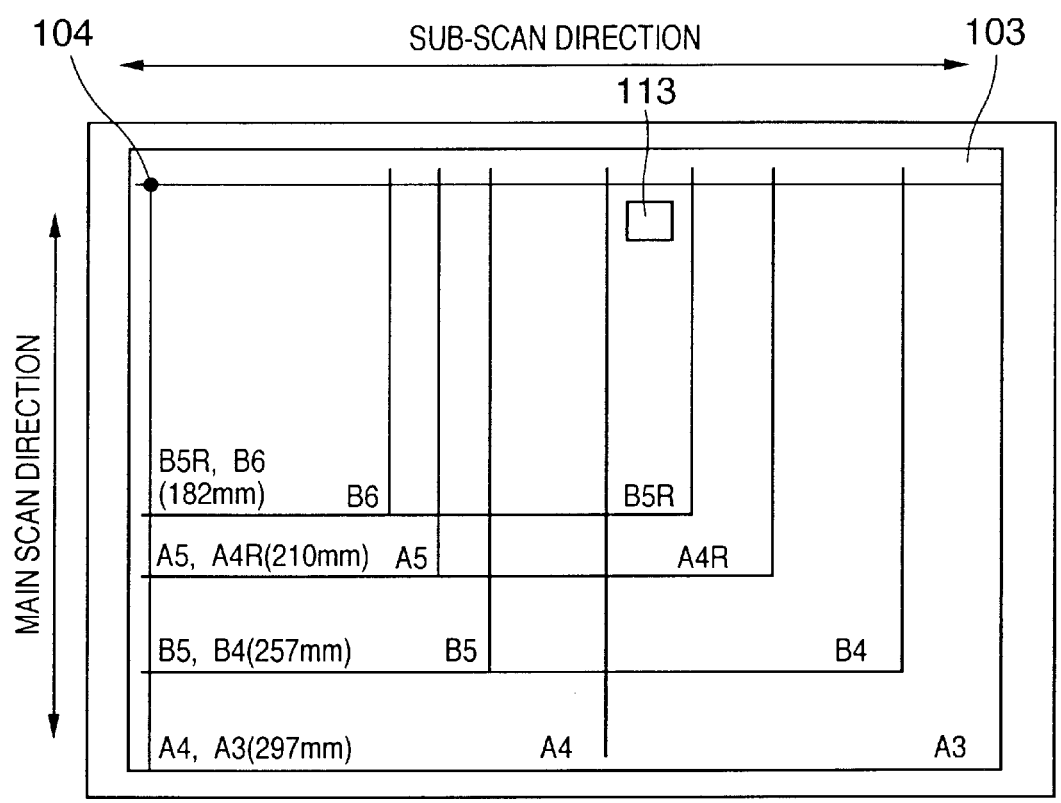
FIG. 3 is a top view showing the arrangement of a platen of the image reading apparatuses according to the first and second embodiments of the present invention.

FIG. 2 is a view showing the arrangement of an image reading system of an image reading apparatus according to the first embodiment of the present invention. FIG. 3 is a top view showing the arrangement of a platen glass of the image reading apparatus according to the first embodiment of the present invention. The image reading apparatus according to the first embodiment of the present invention is a general digital image reading apparatus to which original size sensing of the present invention is applied. In this image reading apparatus, a platen glass 102, an optical base 107 having a lamp 105 and a mirror 106, an optical base 110 having mirrors 108 and 109, a lens 111, a CCD 112, and an original size sensor 113 are arranged in a housing 114. Reference numeral 101 in FIG. 2 denotes an original.

The above arrangement will be described in detail below. The platen glass 102 forms the upper portion of the housing 114, and the original 101 to be read is placed on this platen glass 102. An original size label 103 is arranged on the perimeter of the platen glass 102. Also, an original alignment mark 104 is formed in a reference registration position at the upper left corner shown in FIG. 3. Fixed-size originals are placed as shown in FIG. 3. The lamp 105 of the optical base 107 irradiates the original surface with light. The mirror 106 of the optical base 107 reflects the light emitted from the lamp 105 and reflected by the original.

The mirrors 108 and 109 of the optical base 110 reflect the light reflected by the mirror 106 of the optical base 107, thereby directing the reflected light toward the lens 111. This lens 111 concentrates the light from the original surface, which is guided by the optical base 110. The CCD 112 is a photoelectric converting element for receiving the light from the original surface, which is concentrated by the lens 111, and for photoelectrically converting the light. The original size sensor 113 senses the original size in the sub-scan direction of the original 101 placed on the platen glass 102. This original size sensor 113 outputs, by a binary number, the presence/absence of an original, at the position of the original size sensor 113, on the platen glass 102. Original reading is performed using the above arrangement.

Figure 1:
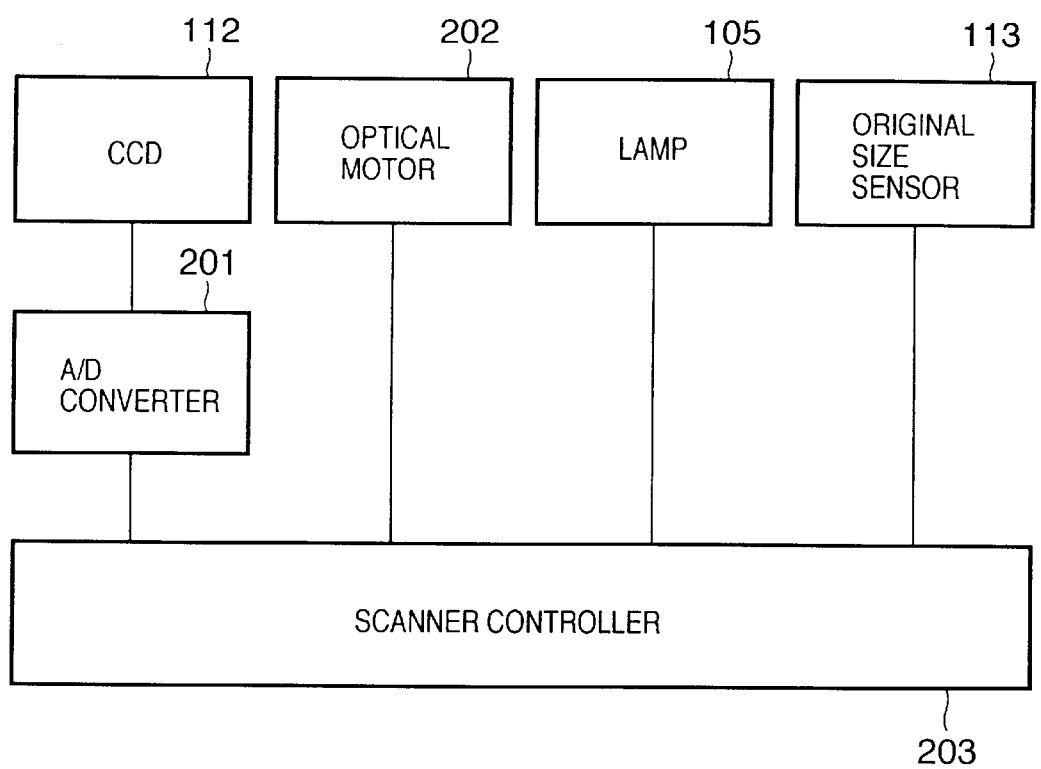
FIG. 1 a block diagram showing the arrangement of a control system of image reading apparatuses according to the first to fourth embodiments of the present invention.

FIG. 1 is a block diagram showing the arrangement of a control system of the image reading apparatus according to the first embodiment of the present invention. This control system of the image reading apparatus according to the first embodiment of the present invention comprises the lamp 105, the CCD 112, the original size sensor 113, an A/D converter 201, an optical motor 202, and a scanner controller 203.

The above arrangement will be described in detail below. The CCD 112 reads an original by receiving light from the original surface as described above. The A/D converter 201 performs analog-to-digital conversion on the output signal from the CCD 112. The optical motor 202 moves the optical bases 107 and 110 to scan the original. The lamp 105 irradiates the original surface with light as described above. The original size sensor 113 senses the presence/absence of an original in the sub-scan direction of an original as described above.

The scanner controller 203 controls the CCD 112, the optical motor 202, the lamp 105, and the original size sensor 113, and senses the length in the main scan direction of an original from an output digital signal from the A/D converter 201. Also, the scanner controller 203 controls the original size sensor 113 to determine the presence/absence of an original in the sub-scan direction. On the basis of these two sensing results, the scanner controller 203 determines the original size. Additionally, this scanner controller 203 executes original size sensing processes shown in flow charts of FIG. 13 (first embodiment) and FIG. 14 (second embodiment) to be described later.

Figure 4:
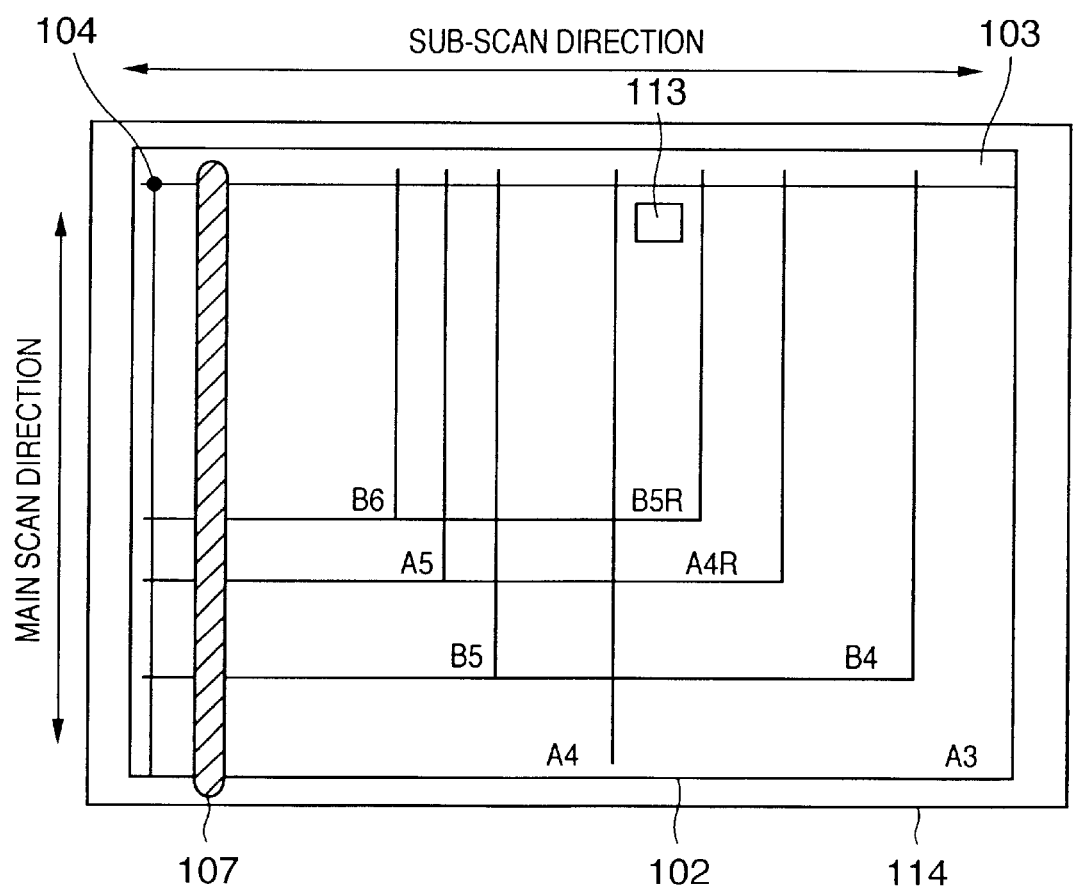
FIG. 4 is a top view showing a sensing point used in original size determination on a platen glass of the image reading apparatuses according to the first and second embodiments of the present invention.

FIG. 4 is a top view showing a sensing point used in original size determination on the platen glass of the image reading apparatus according to the first embodiment of the present invention. The original size sensor (reflection sensor) 113 for sensing the presence/absence of an original in the sub-scan direction is positioned at the sensing point shown in FIG. 4. The optical base 107 is placed at the position shown in FIG. 4 and the CCD 112 reads the original only in the main scan direction, thereby sensing the original width in the main scan direction.

An operation when the image reading apparatus according to the first embodiment of the present invention having the above construction senses an original size will be described in detail below with reference to FIGS. 1 to 8, 12, and 13.

Figure 5:
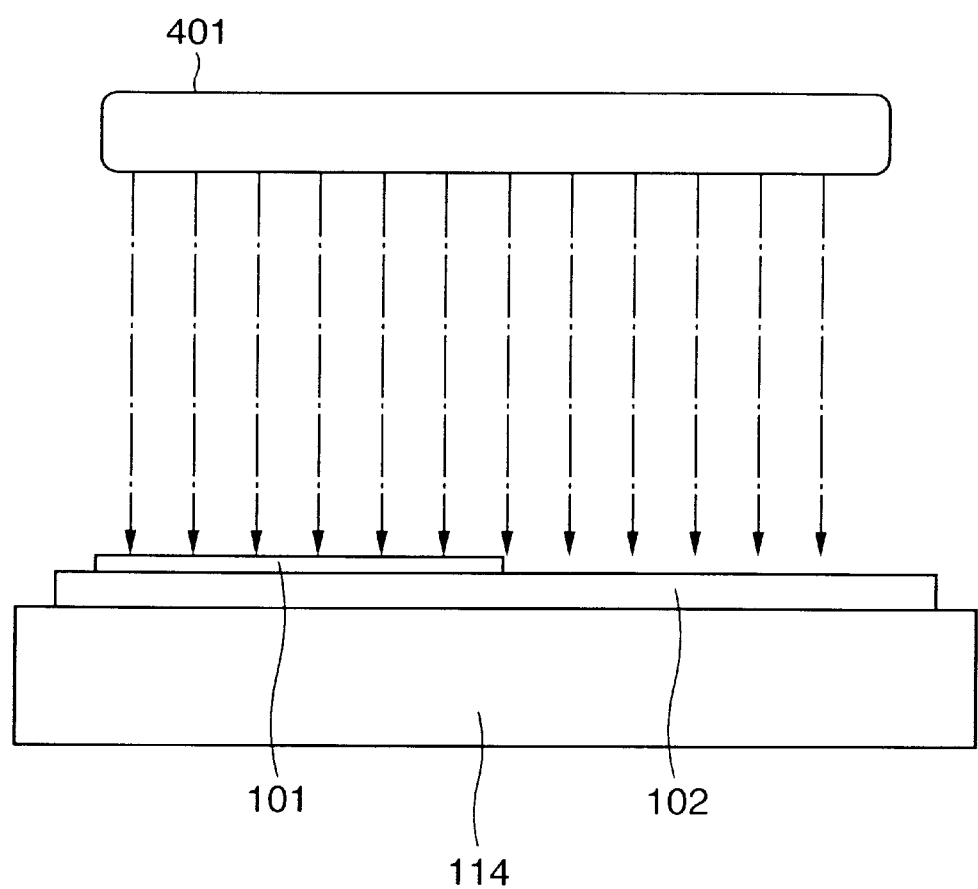
FIG. 5 is a side view showing the positional relationship between the image reading apparatuses according to the first and second embodiments of the present invention and a fluorescent lamp.
Figure 6:
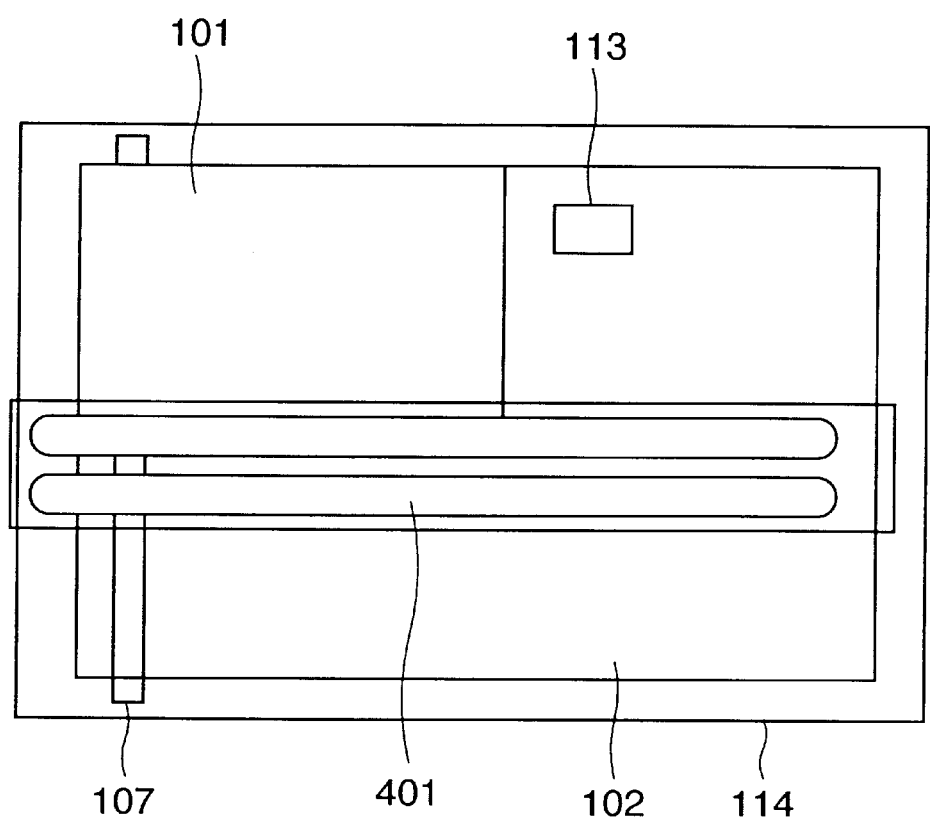
FIG. 6 is a top view showing the positional relationship between the image reading apparatuses according to the first and second embodiments of the present invention and the fluorescent lamp.

In this first embodiment, original size sensing when a fluorescent lamp 401 as a source of ambient light is present above the image reading apparatus as shown in FIGS. 5 and 6 will be explained.

Figure 13:
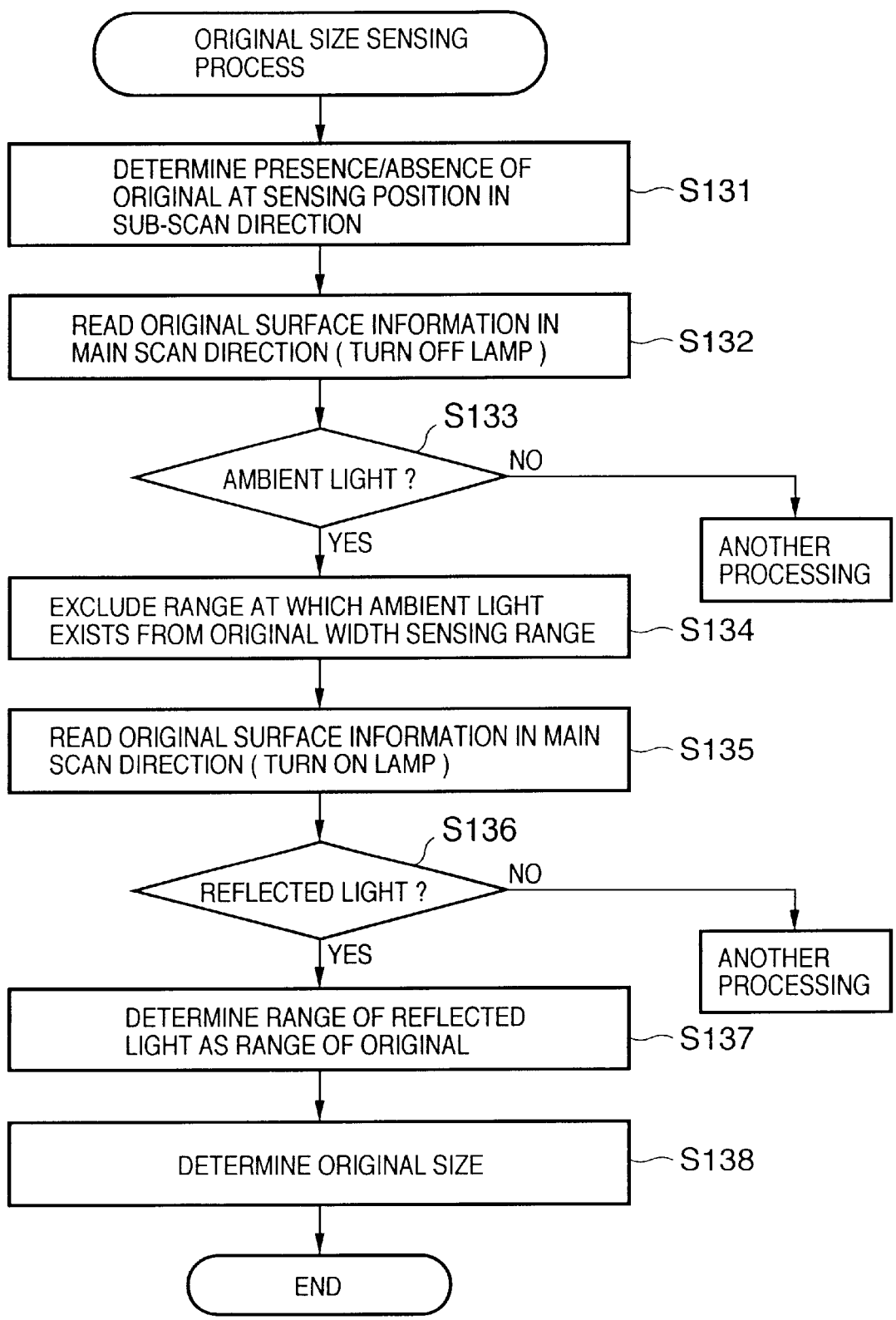
FIG. 13 is a flow chart showing the original size sensing process of the image reading apparatus according to the first embodiment of the present invention.

FIG. 13 is a flow chart showing the procedure of an original size sensing process in the first embodiment of the present invention. First, the scanner controller 203 of the image reading apparatus controls the original size sensor 113 to determine the presence/absence of an original at the sensing position (i.e., the mounted position of the original size sensor 113) on the basis of a binary output signal from the original size sensor 113 (step S131).

Figure 7:
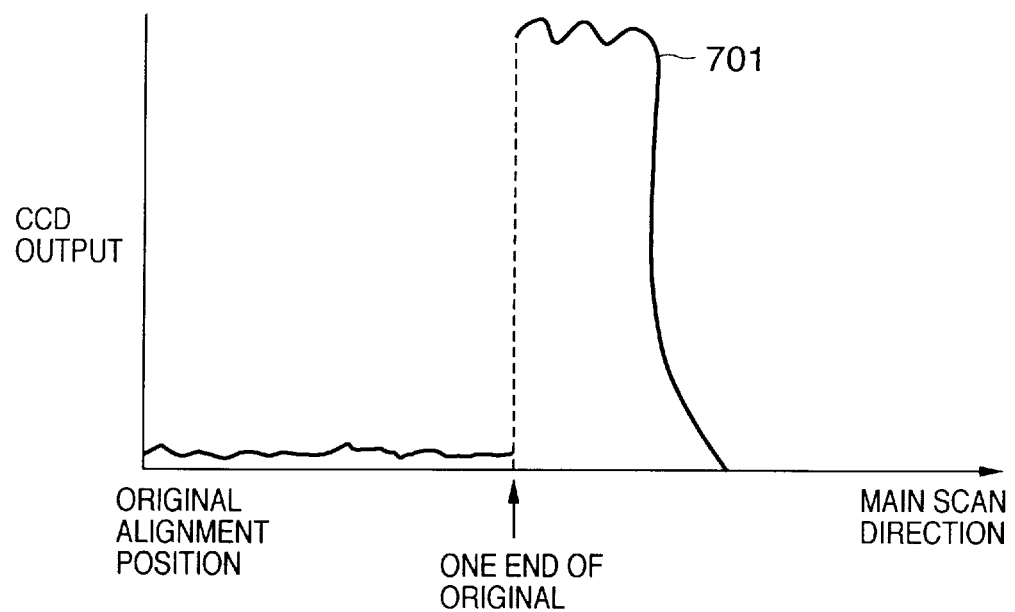
FIG. 7 is a graph showing the relationship between the CCD output and the main scan position in the image reading apparatuses according to the first and second embodiments of the present invention.

The scanner controller 203 then turns off the lamp 105 and causes the CCD 12 to read one line of the original (step S132). FIG. 7 shows an example of the read data. In this case, light from the fluorescent lamp 401, i.e., ambient light, is incident on the CCD 112 as indicated by 701 in FIG. 7. However, a portion where the original is placed on the platen glass 102 is shielded from the light from the fluorescent lamp 401 above the image reading apparatus. Therefore, a signal value in this portion becomes lower than that in a portion where no original is present.

Figure 8:
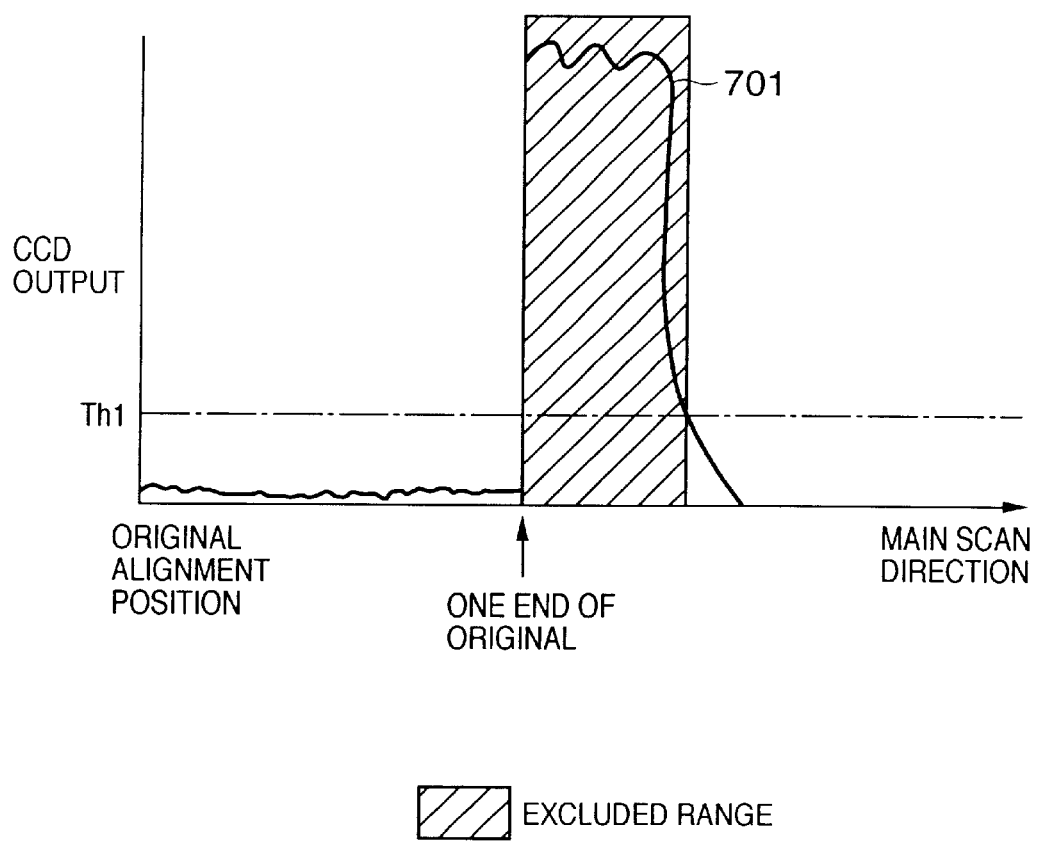
FIG. 8 is a graph showing the relationship between the CCD output and the main scan position and a range excluded from sensing in the image reading apparatus according to the first embodiment of the present invention.

By using this phenomenon in which the ambient light is shielded by the set original, the scanner controller 203 causes the A/D converter 201 to convert the output signal from the CCD 112 into a digital signal, and determines the presence/absence of ambient light in the main scan direction on the basis of a preset threshold value Th1 (step S133). If no ambient light is found (NO in step S133), original size sensing is performed by another method. When this is the case, any conventional method which is effective in the absence of ambient light can be used. If ambient light is found, the scanner controller 203 excludes a pixel range of the CCD 112, from which a signal value higher than the threshold value Th1 is output, from a pixel range to be used in original width sensing (step S134). FIG. 8 shows the excluded range. The scanner controller 203 then turns on the lamp 105 and causes the CCD 112 to read original surface information (step S135).

Figure 9:
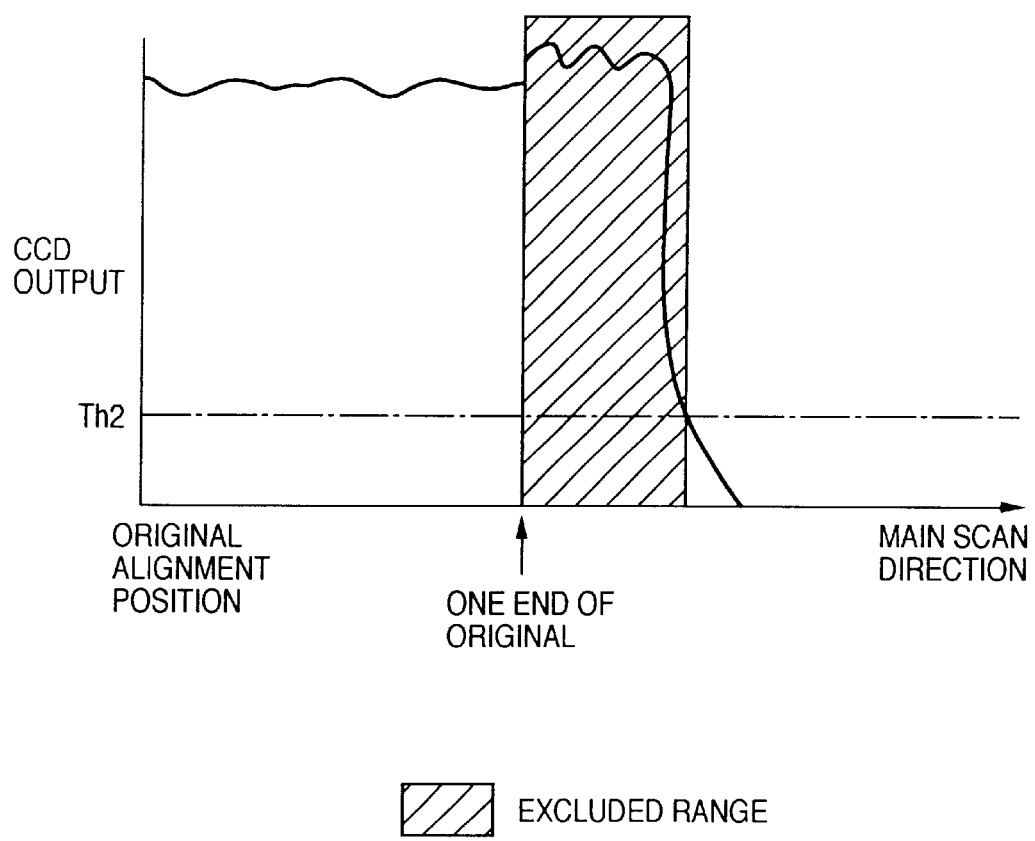
FIG. 9 is a graph showing the relationship between the CCD output and the main scan position and the range excluded from sensing in the image reading apparatus according to the first embodiment of the present invention.

In this case, signals can be read out only from a pixel range of the CCD 112, except for the pixel range excluded in step S134. It is also possible to once read out signals from all pixels of the CCD 112 and discard a signal corresponding to the pixel range excluded in step S134 from the readout signals. FIG. 9 shows an example of data read by the latter method. As shown in FIG. 9, a signal corresponding to light reflected by the original 101 and a signal corresponding to light inputted from the fluorescent lamp 401 are obtained. From these signals, a signal readout from pixels in the excluded range (a signal in a hatched portion) is discarded.

Subsequently, the scanner controller 203 causes the A/D converter 201 to convert the output signal from the CCD 112 into a digital signal, and determines the presence/absence of reflected light from the original on the basis of the preset threshold value Th2 (step S136). This determination is performed for a signal outside the pixel range excluded in step S134. If no reflected light is found, another processing is performed. If reflected light is found, the scanner controller 203 determines that the range in the main scan direction within which the reflected light is found is the range in which the original exists (step S137). Accordingly, it is possible to determine whether a size corresponding to the original width in the main scan direction is either of B6 and B5R, or either of A5 and A4R, or either of B5 and B4, or either of A4 and A3.

After that, on the basis of the result of the determination in the sub-scan direction by the original size sensor 113 and the result of the determination in the main scan direction by the CCD 112, the scanner controller 203 determines the original size by looking up a table shown in FIG. 12 (step S138).

In the first embodiment of the present invention as described above, ambient light is sensed by turning off the lamp 105 of the image reading apparatus, so sensing errors caused by ambient light can be reduced. Also, a range in the main scan direction where ambient light is found is excluded in the original size sensing. This can realize efficient original size sensing insusceptible to the influence of ambient light. Furthermore, it is possible to reduce time to sense the original size and increase efficiency in the original size sensing.

[Second Embodiment]

An image reading system of an image reading apparatus according to the second embodiment of the present invention has the same arrangement as the first embodiment explained above with reference to FIG. 2, so a detailed description thereof will be omitted.

Also, a control system of the image reading apparatus according to the second embodiment of the present invention has the same arrangement as the first embodiment explained above with reference to FIG. 1, so a detailed description thereof will be omitted.

An operation when this image reading apparatus according to the second embodiment of the present invention senses an original size will be described in detail below with reference to FIGS. 1 to 7, 10 to 12, and 14.

In the second embodiment, original size sensing when a fluorescent lamp 401 as a source of ambient light is present above the image reading apparatus as shown in FIGS. 5 and 6 will be explained as in the first embodiment.

Figure 14:
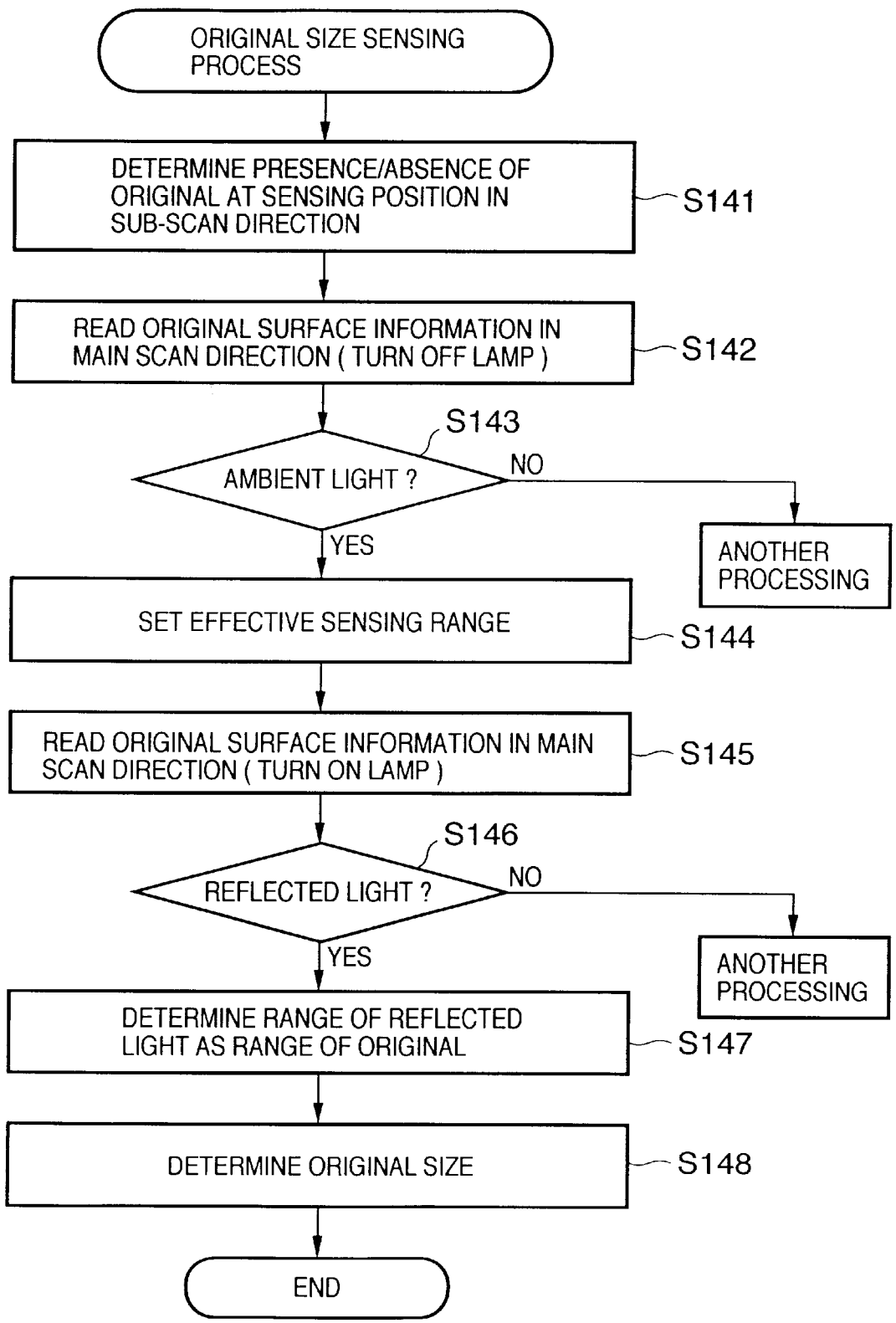
FIG. 14 is a flow chart showing the original size sensing process of the image reading apparatus according to the second embodiment of the present invention.

FIG. 14 is a flow chart showing the procedure of an original size sensing process in the second embodiment of the present invention. First, a scanner controller 203 of the image reading apparatus controls an original size sensor 113 to determine the presence/absence of an original at the sensing position (i.e., the mounted position of the original size sensor 113) on the basis of a binary output signal from the original size sensor 113 (step S141).

The scanner controller 203 then turns off a lamp 105 and causes a CCD 112 to read one line of the original (step S142). FIG. 7 shows an example of the read data. In this case, light from the fluorescent lamp 401, as ambient light, is incident on the CCD 112 as indicated by 701 in FIG. 7. However, an area where the original is placed on a platen glass 102 is shielded from the light from the fluorescent lamp 401 above the image reading apparatus. Therefore, a signal value in this portion becomes lower than that in a portion where no original is present.

Figure 10:
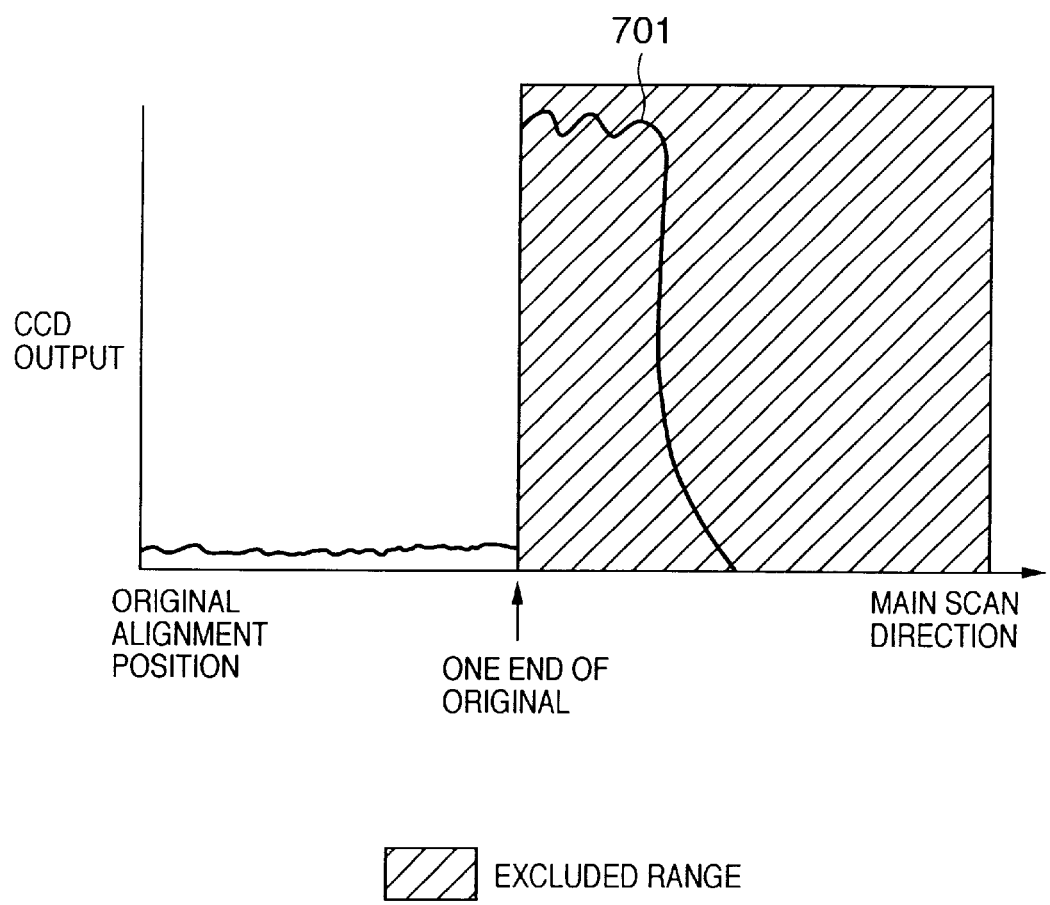
FIG. 10 is a graph showing the relationship between the CCD output and the main scan position and a range excluded from sensing in the image reading apparatus according to the second embodiment of the present invention.

By using this phenomenon in which the ambient light is shielded by the set original, the scanner controller 203 causes an A/D converter 201 to convert the output signal from the CCD 112 into a digital signal, and determines the presence/absence of ambient light in the main scan direction on the basis of a preset threshold value Th1 (step S143). If no ambient light exists (NO in step S143), original size sensing is performed by another method. When this is the case, any conventional method which is effective in the absence of ambient light can be used. If ambient light is found, the scanner controller 203 sets only a pixel range closer to an original alignment mark than a boundary point between an ambient light absent range (i.e., a range in which the signal value is lower than the threshold value Th1) and an ambient light present range (i.e., a range in which the signal value is higher than the threshold value Th1), as an effective sensing range (step S144). FIG. 10 shows the excluded range. The scanner controller 203 turns on the lamp 105 and causes the CCD 112 to read original surface information (step S145).

Figure 11:
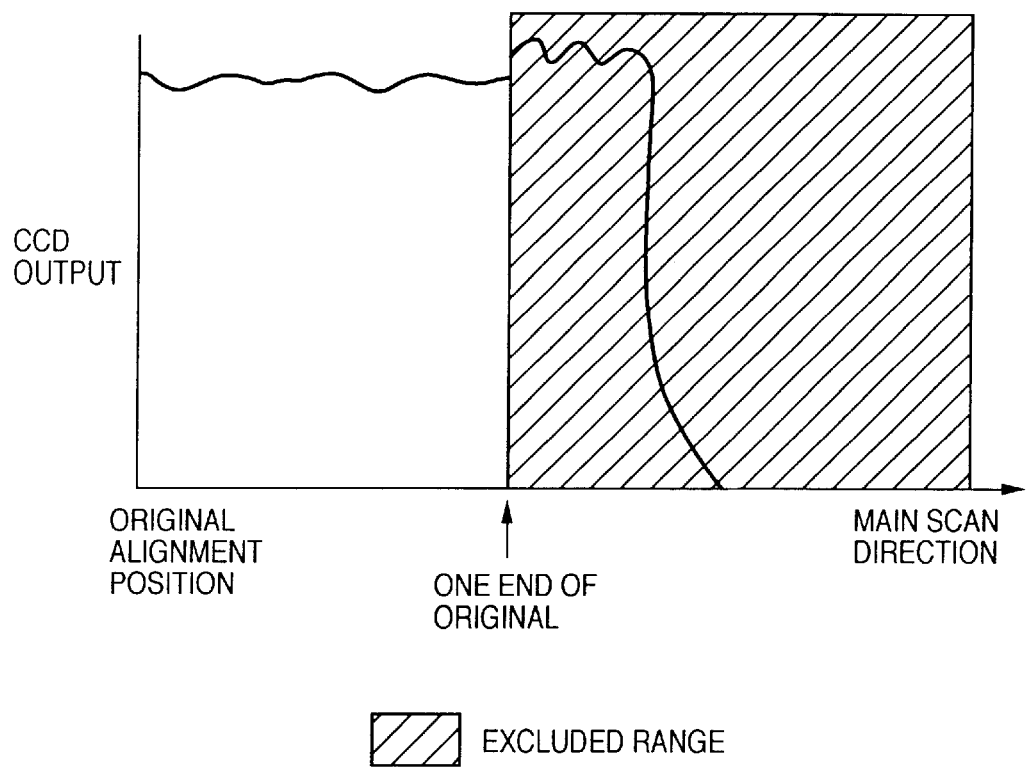
FIG. 11 is a graph showing the relationship between the CCD output and the main scan position and the range excluded from sensing in the image reading apparatus according to the second embodiment of the present invention.

In this case, signals can be read out only from a pixel range of the CCD 112, within the effective sensing range set in step S144. It is also possible to once read out signals from all pixels of the CCD 112 and extract only a signal corresponding to the effective sensing range set in step S144. FIG. 11 shows an example of data read by the latter method.

Subsequently, the scanner controller 203 causes the A/D converter 201 to convert the output signal from the CCD 112 into a digital signal, and determines the presence/absence of reflected light from the original on the basis of the preset threshold value Th2 (step S146). This determination is performed for a signal in the effective sensing range set in step S144. If no reflected light is found, another processing is performed. If reflected light is found, the scanner controller 203 determines that the range in the main scan direction within which the reflected light is found is the range in which the original exists (step S147). Accordingly, it is possible to determine whether a size corresponding to the original width in the main scan direction is either of B6 and B5R, or either of A5 and A4R, or either of B5 and B4, or either of A4 and A3.

After that, on the basis of the result of the determination in the sub-scan direction by the original size sensor 113 and the result of the determination in the main scan direction by the CCD 112, the scanner controller 203 determines the original size by looking up a table shown in FIG. 12 (step S148).

In the second embodiment of the present invention as described above, ambient light is sensed by turning off the lamp 105 of the image reading apparatus, so sensing errors caused by ambient light can be reduced. Also, an original alignment mark 104 is added to a reference registration portion of the platen glass 102 of the image reading apparatus. When an original is placed to be aligned with this mark 104, only a range closer to the original alignment mark 104 than the boundary point between the range within which no ambient light is found and the range within which ambient light is found can be set as an effective sensing range. This can realize efficient original size sensing insusceptible to the influence of ambient light. Furthermore, it is possible to reduce time to sense the original size and increase efficiency in the original size sensing.

[Third Embodiment]

An image reading system of an image reading apparatus according to the third embodiment of the present invention has the same arrangement as the first embodiment explained above with reference to FIG. 2, so a detailed description thereof will be omitted.

Also, a control system of the image reading apparatus according to the third embodiment of the present invention has the same arrangement as the first embodiment explained above with reference to FIG. 1, so a detailed description thereof will be omitted.

Figure 15:
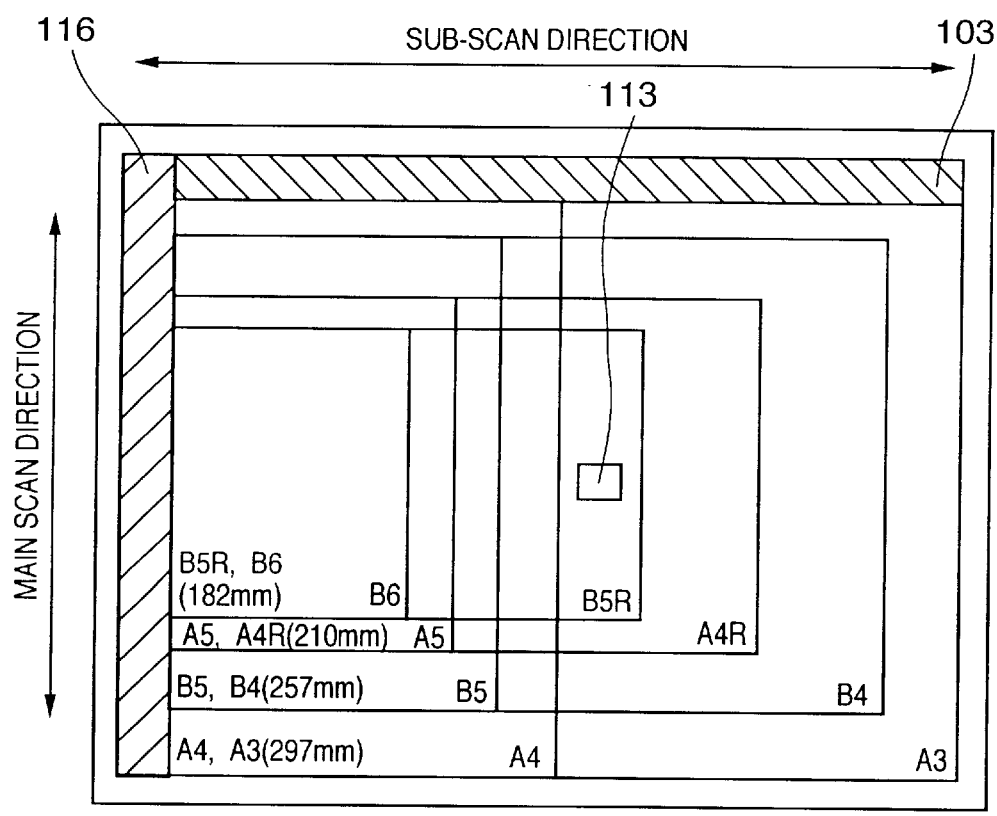
FIG. 15 is a top view showing the arrangement of a platen of the image reading apparatuses according to the third embodiment of the present invention.

FIG. 15 is a top view showing the arrangement of a platen glass of the image reading apparatus according to the third embodiment of the present invention. The difference between the configuration of the third embodiment and that of the first and second embodiments is that another original size label 116 is arranged along the perimeter of the platen glass 102 in the main scan direction in addition to the original size label 103 which is arranged along the perimeter in the sub-scan direction, and an original is placed as shown in FIG. 15.

Figure 16:
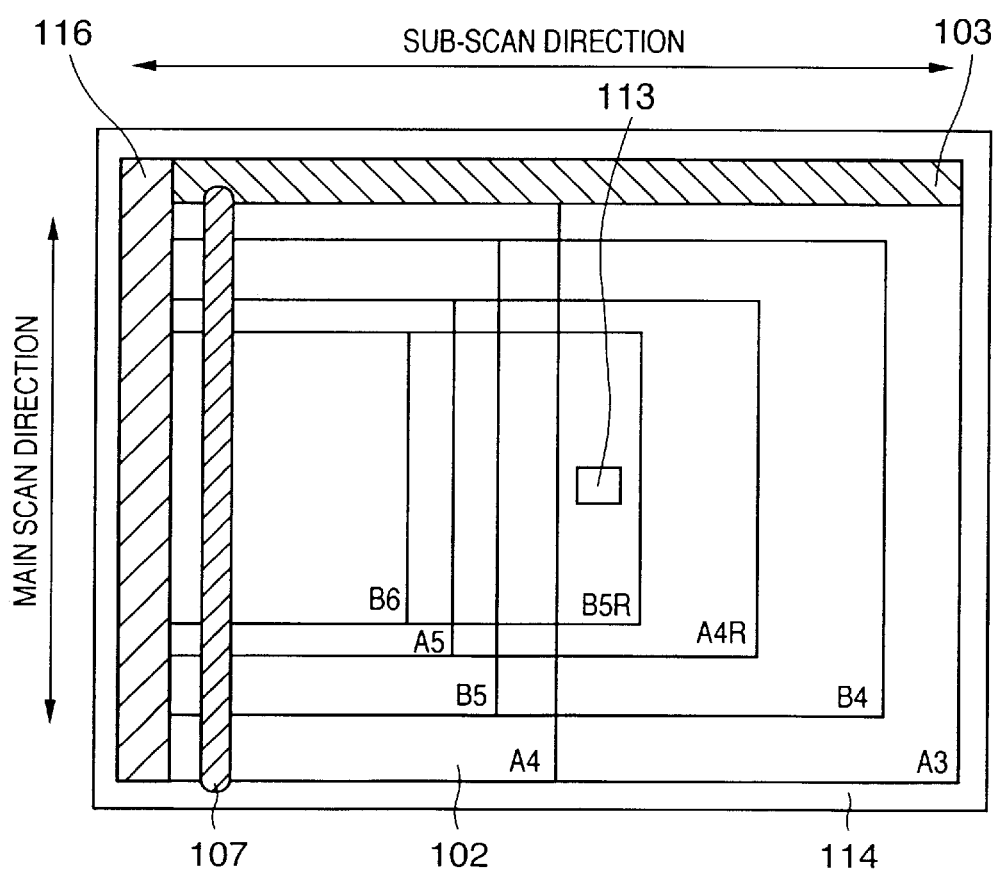
FIG. 16 is a top view showing a sensing point used in original size determination on a platen glass of the image reading apparatuses according to the third embodiment of the present invention.

FIG. 16 is a top view showing a sensing point used in original size determination on the platen glass of the image reading apparatus according to the third embodiment of the present invention. The original size sensor (reflection sensor) 113 for sensing the presence/absence of an original in the sub-scan direction is positioned at the sensing point shown in FIG. 16. The optical base 107 is placed at the position shown in FIG. 16 and the CCD 112 reads the original only in the main scan direction, thereby sensing the original width in the main scan direction.

An operation when this image reading apparatus according to the third embodiment of the present invention senses an original size will be described in detail below with reference to FIGS. 1, 2, 5, and 14 to 20.

Figure 17:
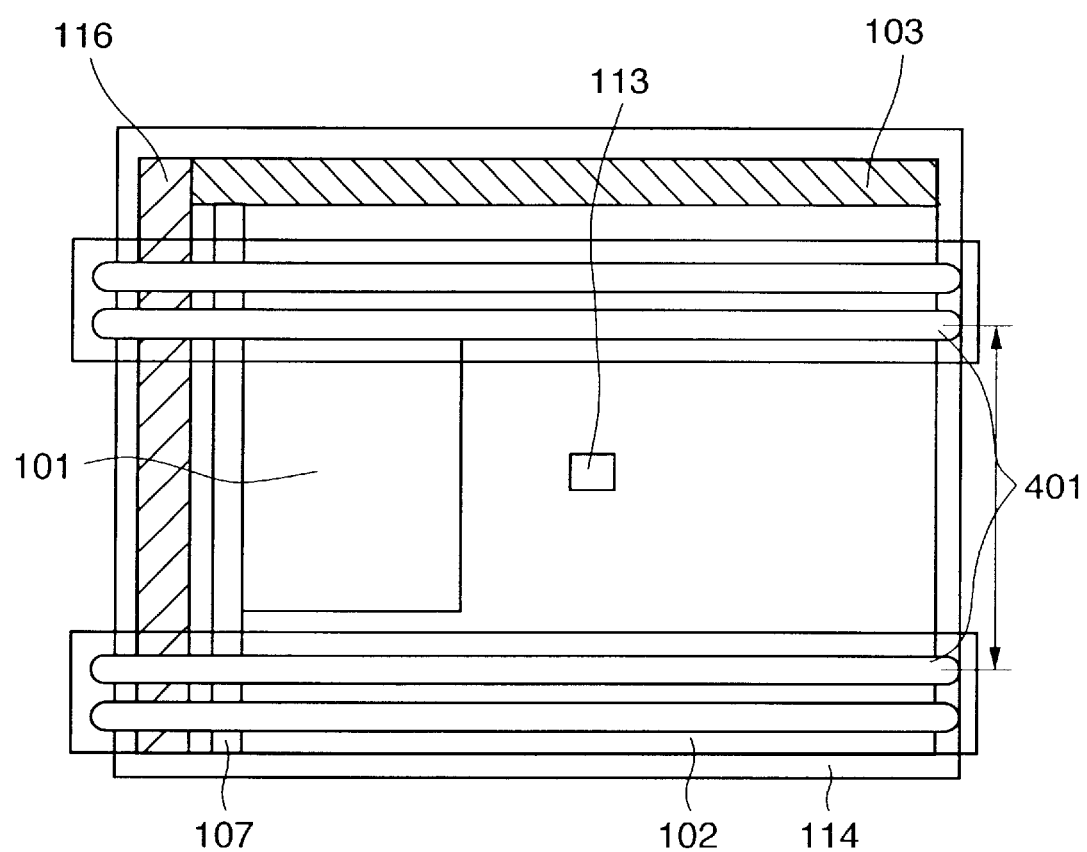
FIG. 17 is a top view showing the positional relationship between the image reading apparatuses according to the third embodiment of the present invention and the fluorescent lamp.

In the third embodiment, original size sensing when a fluorescent lamp 401 as a source of ambient light is present above the image reading apparatus as shown in FIGS. 5 and 17 will be explained.

Since the basic processing sequence of the image reading apparatus in the third embodiment is similar to that in the second embodiment, the flowchart in FIG. 14 is referred.

First, a scanner controller 203 of the image reading apparatus controls an original size sensor 113 to determine the presence/absence of an original at the sensing position (i.e., the mounted position of the original size sensor 113) on the basis of a binary output signal from the original size sensor 113 (step S141).

Figure 18:
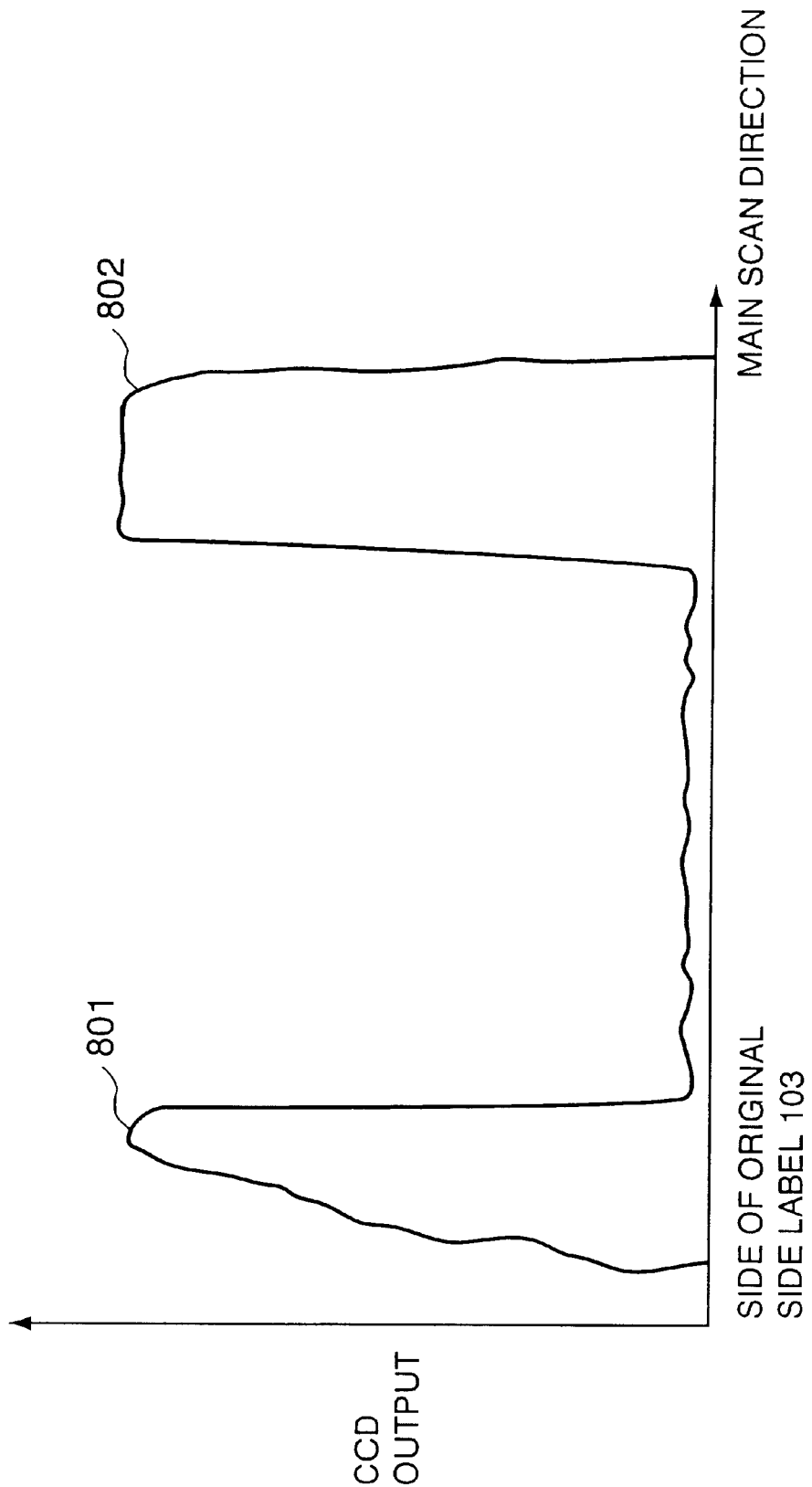
FIG. 18 is a graph showing the relationship between the CCD output and the main scan position in the image reading apparatuses according to the third embodiment of the present invention.

The scanner controller 203 then turns off a lamp 10S and causes a CCD 112 to read one line of the original (step S142). FIG. 18 shows an example of the read data. In this case, light from the fluorescent lamp 401, as ambient light, is incident on the CCD 112 as indicated by 801 and 802 in FIG. 18. However, an area where the original is placed on a platen glass 102 is shielded from the light from the fluorescent lamp 401 above the image reading apparatus. Therefore, a signal value in this portion becomes lower than that in a portion where no original is present.

Figure 19:
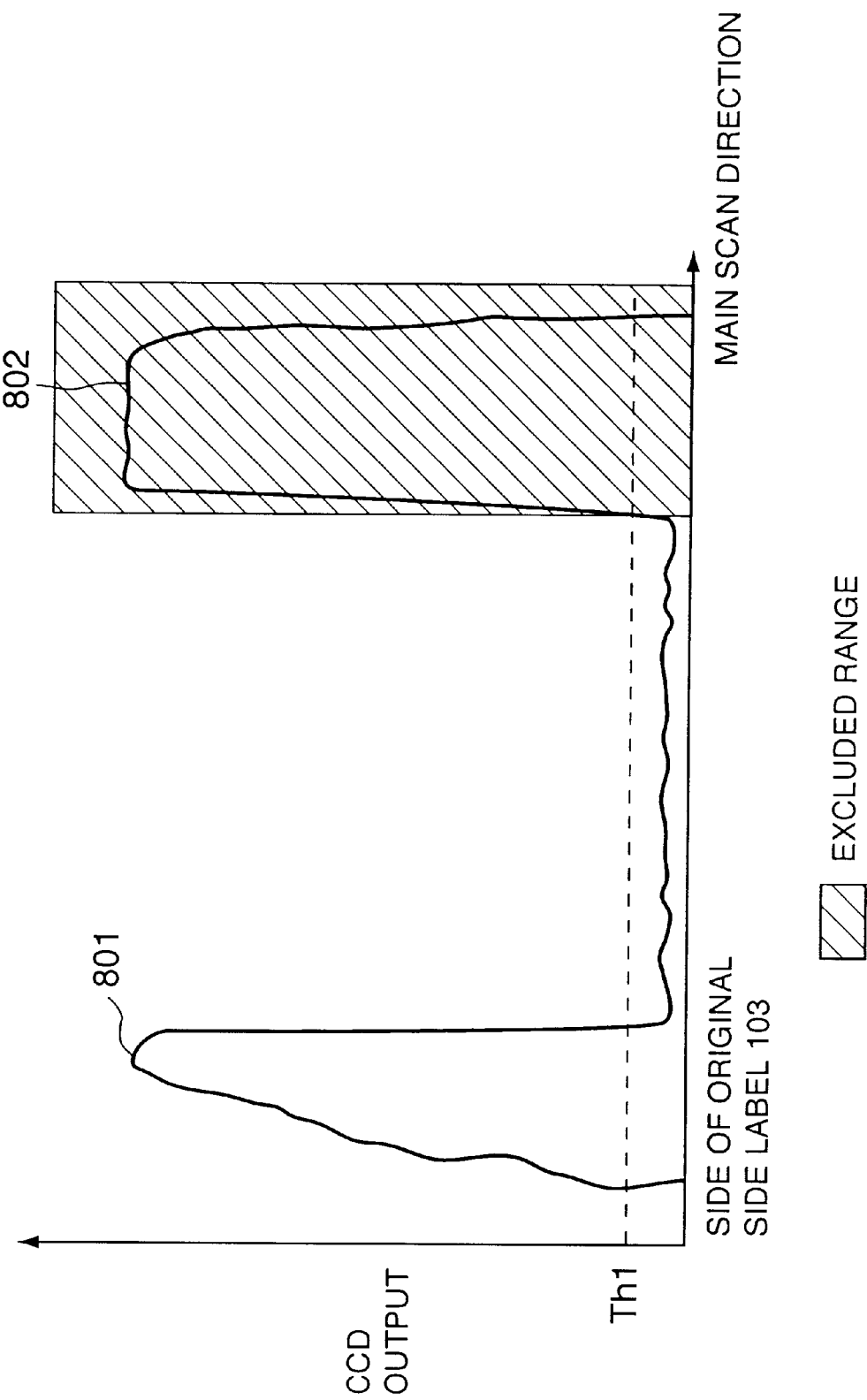
FIG. 19 is a graph showing the relationship between the CCD output and the main scan position and a range excluded from sensing in the image reading apparatus according to the third embodiment of the present invention.
Figure 20:
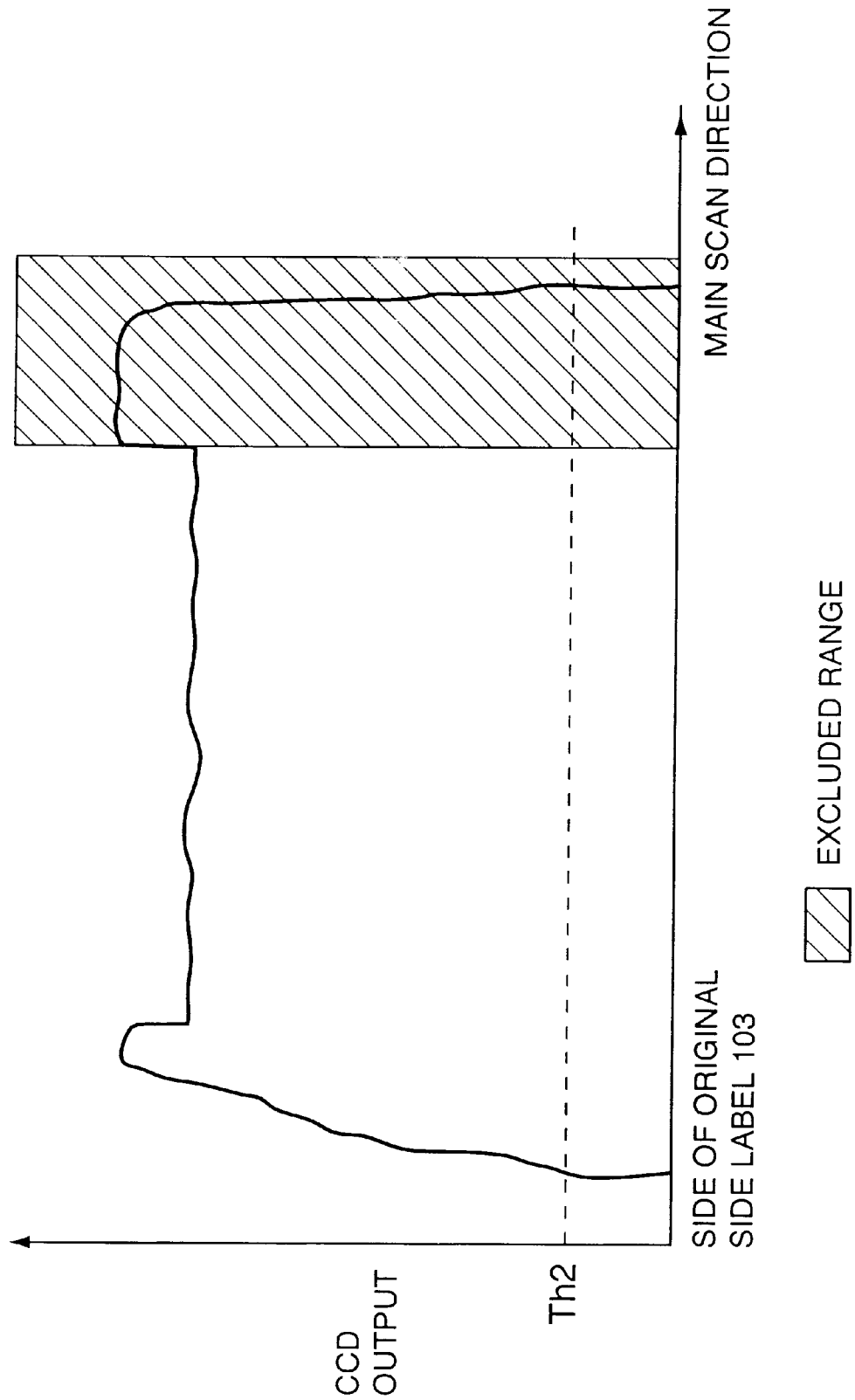
FIG. 20 is a graph showing the relationship between the CCD output and the main scan position and the range excluded from sensing in the image reading apparatus according to the third embodiment of the present invention.

By using this phenomenon in which the ambient light is shielded by the set original, the scanner controller 203 causes an A/D converter 201 to convert the output signal from the CCD 112 into a digital signal, and determines the presence/absence of ambient light in the main scan direction on the basis of a preset threshold value Th1 (step S143). If no ambient light exists (NO in step S143), original size sensing is performed by another method. When this is the case, any conventional method which is effective in the absence of ambient light can be used. If ambient light is found, when the determination of the presence/absence of ambient light is started from the opposite side of the original size label 103, the scanner controller 203 sets only a pixel range closer to the original size label 103 than a boundary point, which is found first, between an ambient light absent range (i.e., a range in which the signal value is lower than the threshold value Th1) and an ambient light present range (i.e., a range in which the signal value is higher than the threshold value Th1), as an effective sensing range (step S144). FIG. 19 shows the excluded range. The scanner controller 203 turns on the lamp 105 and causes the CCD 112 to read original surface information (step S145).

In this case, signals can be read out only from a pixel range of the CCD 112, within the effective sensing range set in step S144. It is also possible to once read out signals from all pixels of the CCD 112 and extract only a signal corresponding to the effective sensing range set in step S144. FIG. 19 shows an example of data read by the latter method.

Subsequently, the scanner controller 203 causes the A/D converter 201 to convert the output signal from the CCD 112 into a digital signal, and determines the presence/absence of reflected light from the original on the basis of the preset threshold value Th2 (step S146). This determination is performed for a signal in the effective sensing range set in step S144. If no reflected light is found, another processing is performed. If reflected light is found, the scanner controller 203 determines that the range in the main scan direction within which the reflected light is found is the range in which the original exists (step S147). Accordingly, it is possible to determine whether a size corresponding to the original width in the main scan direction is either of B6 and B5R, or either of A5 and A4R, or either of B5 and B4, or either of A4 and A3.

After that, on the basis of the result of the determination in the sub-scan direction by the original size sensor 113 and the result of the determination in the main scan direction by the CCD 112, the scanner controller 203 determines the original size by looking up a table shown in FIG. 12 (step S148).

In the third embodiment of the present invention as described above, ambient light is sensed by turning off the lamp 105 of the image reading apparatus, so sensing errors caused by ambient light can be reduced. Also, an original alignment mark 104 is added to a reference registration portion of the platen glass 102 of the image reading apparatus. When an original is placed to be aligned with this mark 104, only a range closer to the original alignment mark 104 than the boundary point between the range within which no ambient light is found and the range within which ambient light is found can be set as an effective sensing range. This can realize efficient original size sensing insusceptible to the influence of ambient light. Furthermore, it is possible to reduce time to sense the original size and increase efficiency in the original size sensing.

It should be noted that the process performed in step S144 may be replaced by the process performed in step S134 of FIG. 13 described in the first embodiment, in which case, the same advantage as that of the third embodiment can be obtained.

[Fourth Embodiment]

An image reading system of an image reading apparatus according to the fourth embodiment of the present invention has the same arrangement as the first embodiment explained above with reference to FIG. 2, so a detailed description thereof will be omitted.

Also, a control system of the image reading apparatus according to the fourth embodiment of the present invention has the same arrangement as the first embodiment explained above with reference to FIG. 1, so a detailed description thereof will be omitted.

An operation when this image reading apparatus according to the second embodiment of the present invention senses an original size will be described in detail below with reference to FIGS. 1 to 6, 12, 21 to 23.

Figure 23:
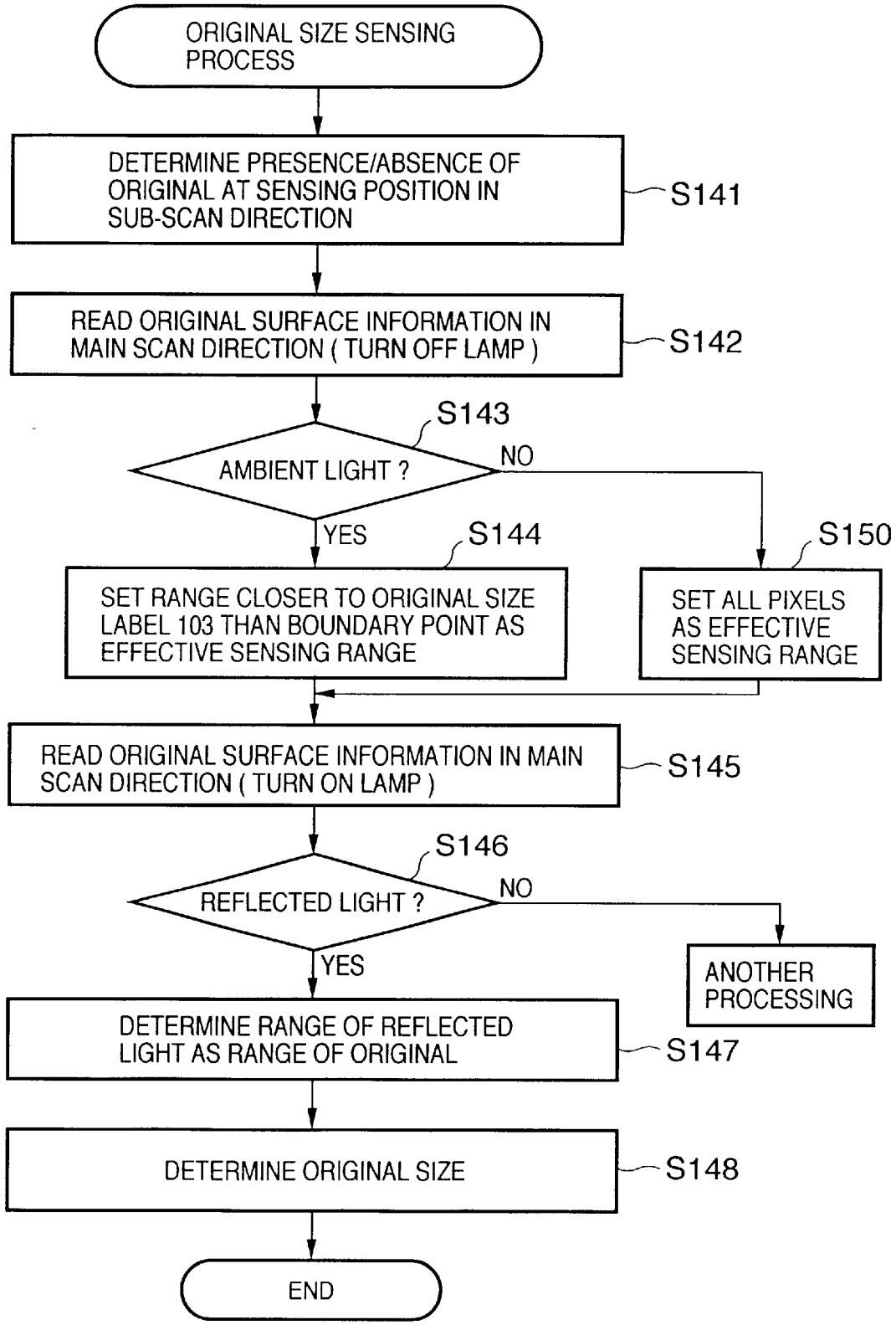
FIG. 23 is a flow chart showing the original size sensing process of the image reading apparatus according to the fourth embodiment of the present invention.

FIG. 23 is a flow chart showing the procedure of an original size sensing process in the fourth embodiment of the present invention.

First, a scanner controller 203 of the image reading apparatus controls an original size sensor 113 to determine the presence/absence of an original at the sensing position (i.e., the mounted position of the original size sensor 113) on the basis of a binary output signal from the original size sensor 113 (step S141).

The scanner controller 203 then turns off a lamp 105 and causes a CCD 112 to read one line of the original (step S142).

The scanner controller 203 causes an A/D converter 201 to convert the output signal from the CCD 112 into a digital signal, and determines the presence/absence of ambient light in the main scan direction on the basis of a preset threshold value Th1 (step S143). When a fluorescent lamp 401 as a source of ambient light is present above the image reading apparatus as shown in FIGS. 5 and 6, the output as indicated by 701 in FIG. 7 is obtained, for instance, then it is determined that ambient light is found. In this case, the process proceeds to step S144, and the scanner controller 203 sets only a pixel range closer to an original alignment mark than a boundary point between an ambient light absent range (i.e., a range in which the signal value is lower than the threshold value Th1) and an ambient light present range (i.e., a range in which the signal value is higher than the threshold value Th1), as an effective sensing range (step S144).

Figure 21:
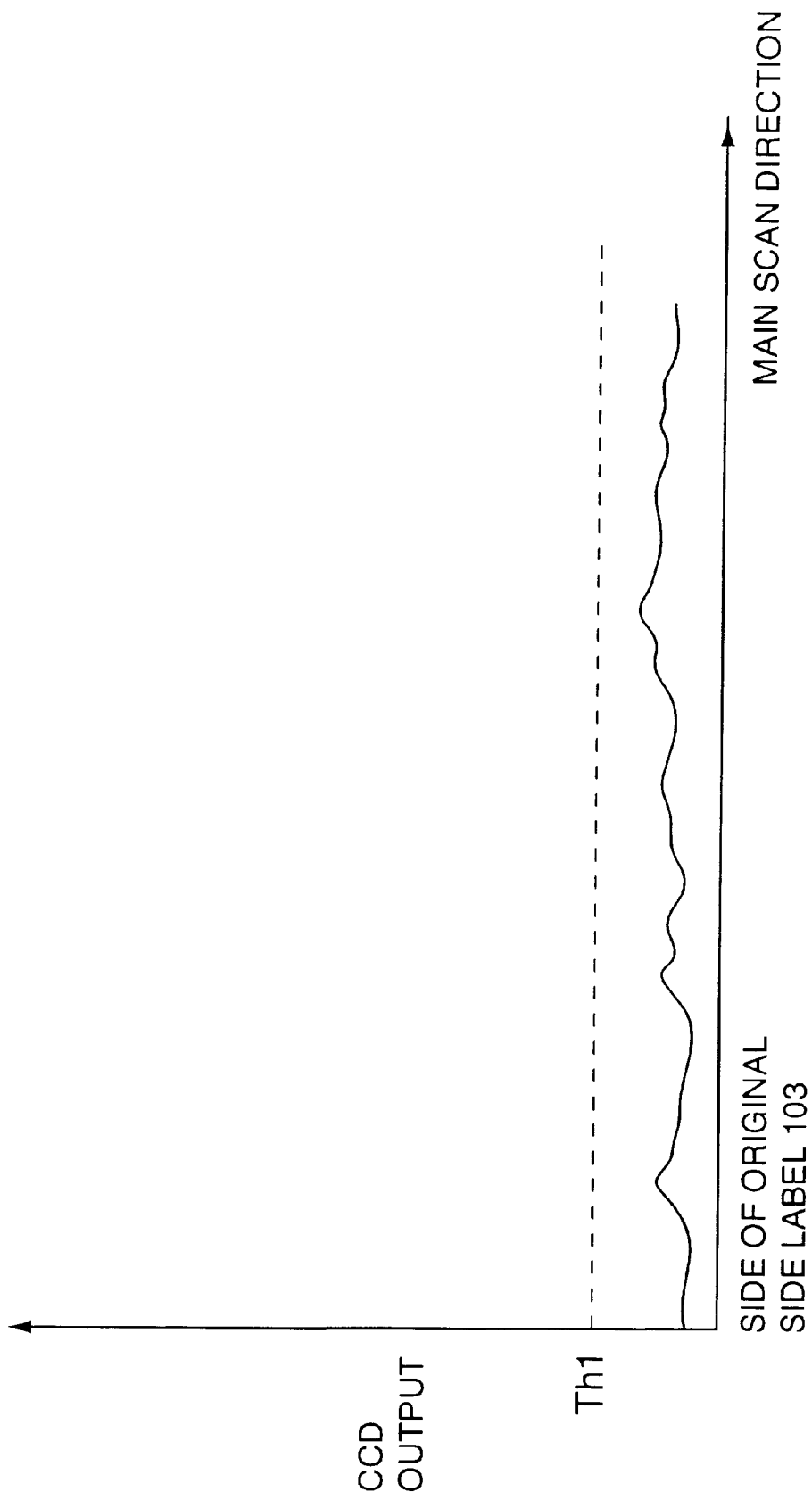
FIG. 21 is a graph showing the relationship between the CCD output and the main scan position in the image reading apparatuses according to the fourth embodiment of the present invention.

If no fluorescent lamp 401 is placed above the image reading apparatus, since no ambient light incidents on the CCD 112, the data read in step S142 is as shown in FIG. 21. Thus, if no ambient light is found (NO in step S143), all the pixels of the CCD 112 is set as an effective sensing range (step S150).

Figure 22:
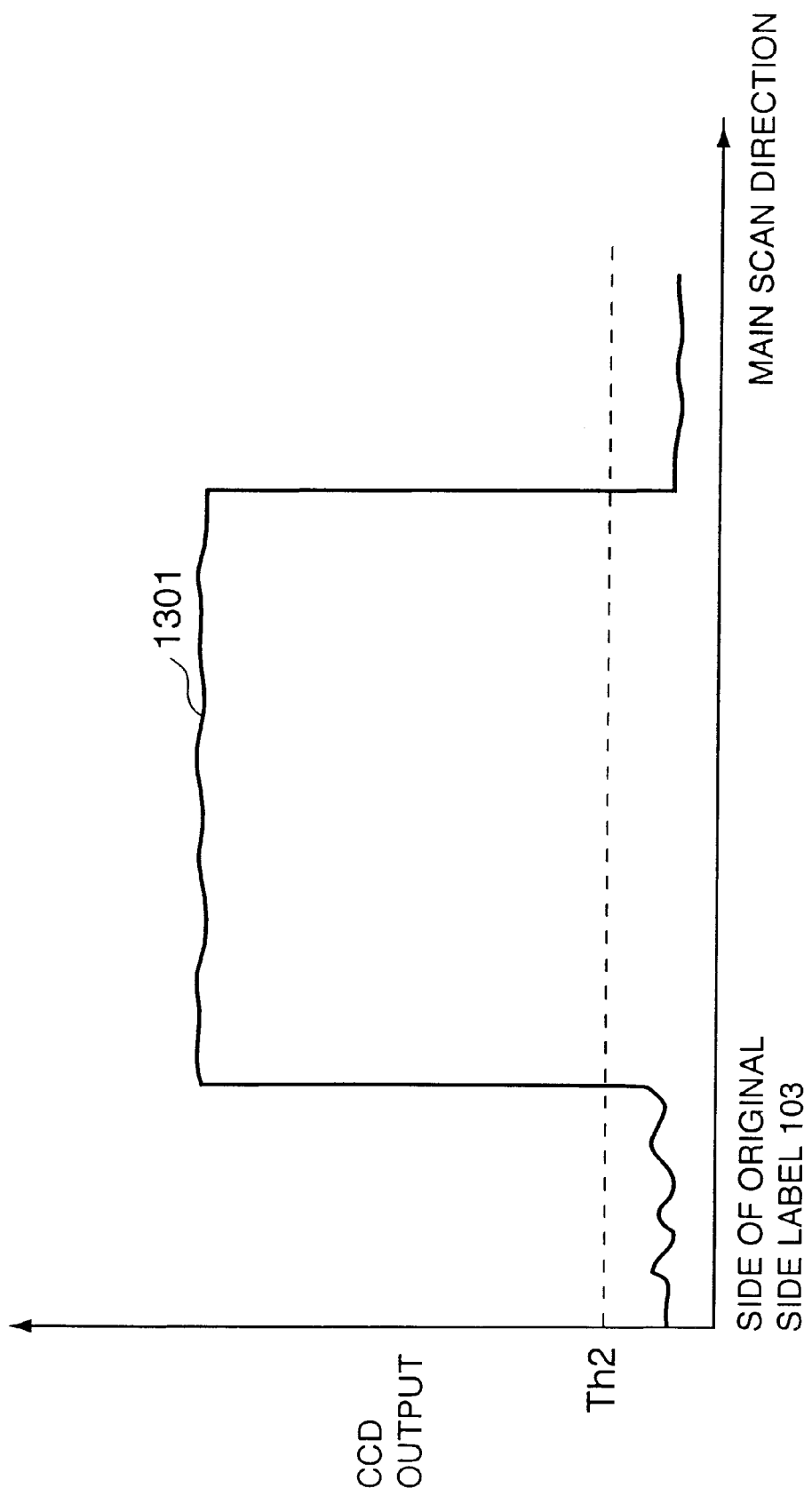
FIG. 22 is a graph showing the relationship between the CCD output and the main scan position and a range excluded from sensing in the image reading apparatus according to the fourth embodiment of the present invention.

Next, the scanner controller 203 turns on the lamp 105 and causes the CCD 112 to read original surface information (step S145). FIG. 22 shows a signal obtained when no ambient light is found.

Subsequently, the scanner controller 203 causes the A/D converter 201 to convert the output signal from the CCD 112 into a digital signal, and determines the presence/absence of reflected light from the original on the basis of the preset threshold value Th2 (step S146). This determination is performed for a signal in the effective sensing range set in step S144. If no reflected light is found, another processing is performed. If reflected light is found, the scanner controller 203 determines that the range in the main scan direction within which the reflected light is found is the range (1301 in FIG. 22) in which the original exists (step S147). Accordingly, it is possible to determine whether a size corresponding to the original width in the main scan direction is either of B6 and B5R, or either of A5 and A4R, or either of B5 and B4, or either of A4 and A3.

After that, on the basis of the result of the determination in the sub-scan direction by the original size sensor 113 and the result of the determination in the main scan direction by the CCD 112, the scanner controller 203 determines the original size by looking up a table shown in FIG. 12 (step S148).

In the second embodiment of the present invention as described above, ambient light is sensed by turning off the lamp 105 of the image reading apparatus, so sensing errors caused by ambient light can be reduced. Further, when no ambient light is found, all the pixels are set as an effective sensing range, therefore, it is possible to perform a precise original size sensing.

[Other Embodiment]

In the first to fourth embodiments of the present invention described above, original size sensing of the present invention is applied to an image reading apparatus. However, the present invention is not limited to original size sensing in an image reading apparatus, and the present invention is also applicable to original size sensing in, e.g., a copying machine and a facsimile apparatus.

The present invention can be applied to a system constituted by a plurality of devices (e.g., host computer, interface, reader, printer) or to an apparatus comprising a single device (e.g., copying machine, facsimile machine).

Figure 25:
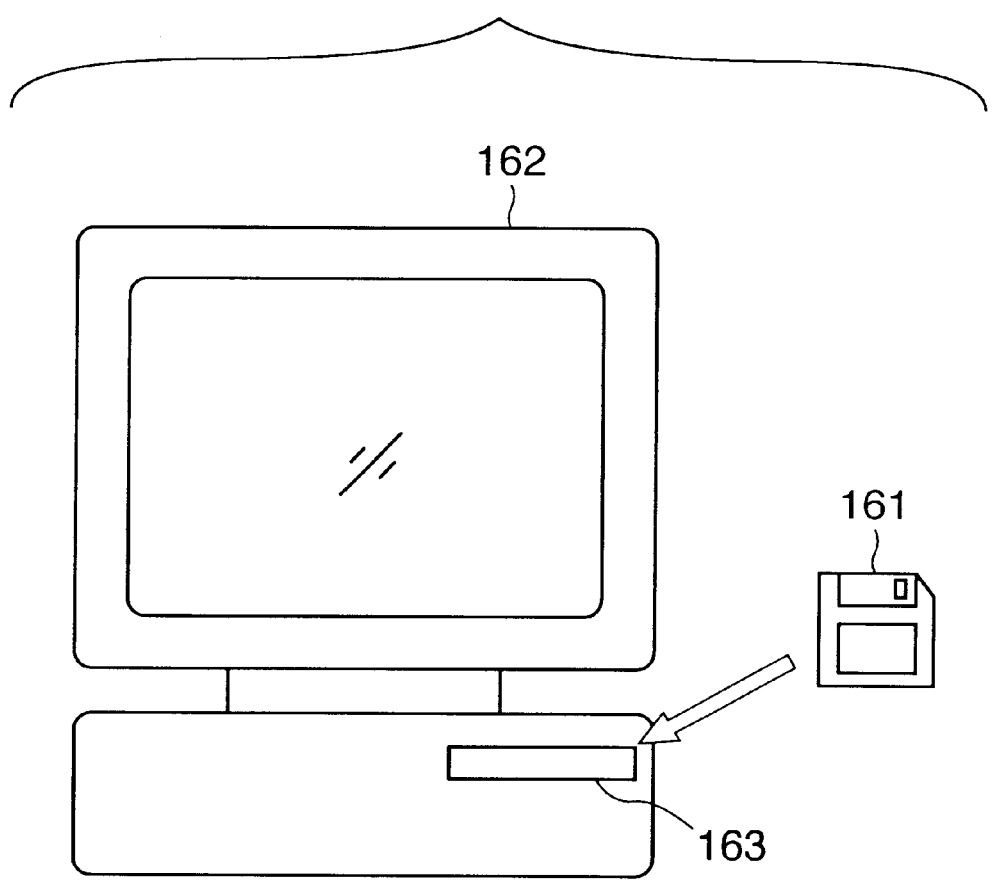
FIG. 25 is a view showing the concept by which the programs and related data according to the first to fourth embodiments of the present invention are supplied from the storage medium to the apparatus.

Further, as shown in FIG. 25, the object of the present invention can also be achieved by providing a storage medium 161 storing program codes and associated data for performing the aforesaid processes to a computer system or apparatus 162 (e.g., a personal computer) via an insertion opening 163, reading the program codes, by a CPU or MPU of the computer system or apparatus, from the storage medium, then executing the program.

In this case, the program codes read from the storage medium realize the functions according to the embodiments, and the storage medium storing the program codes and associated data constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 24:
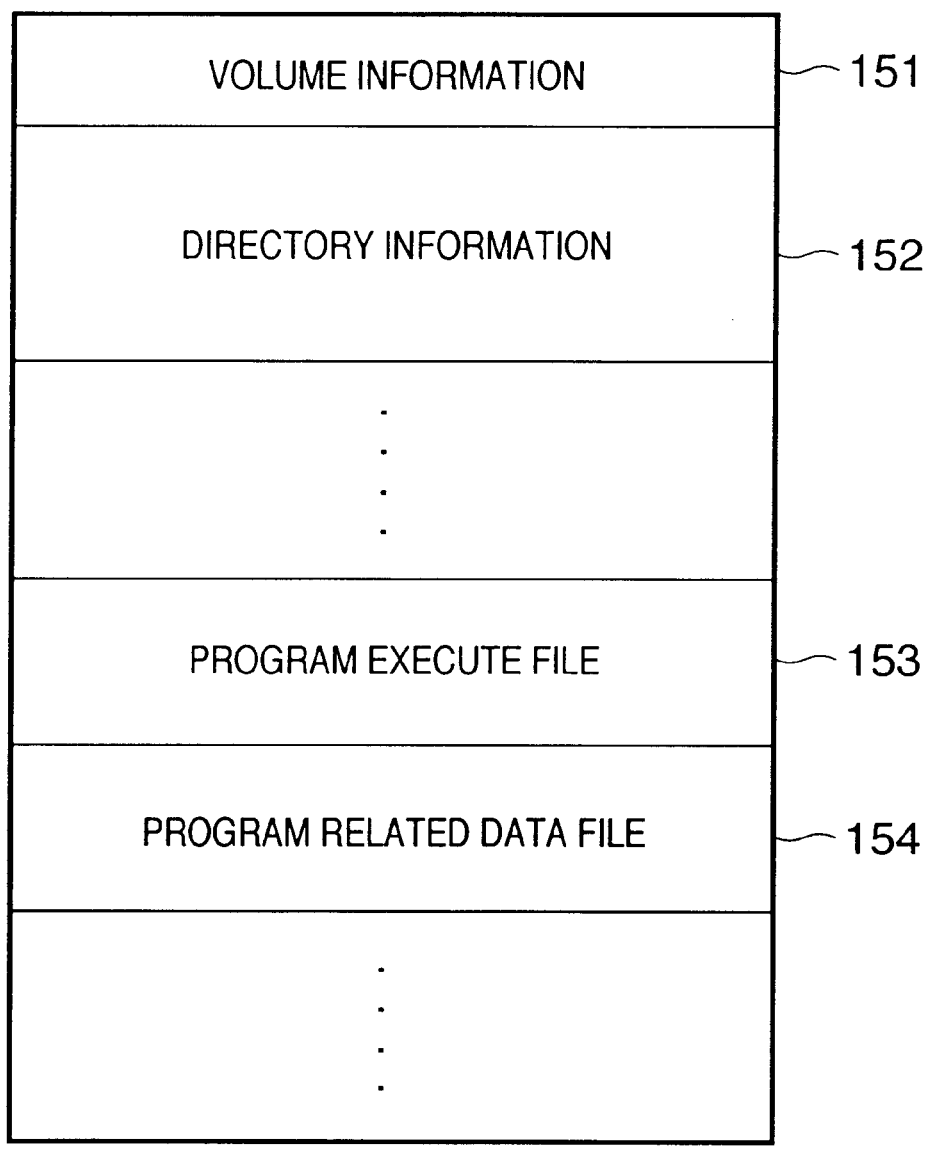
FIG. 24 is a view showing the configuration of the stored contents of a storage medium storing programs and related data according to the first to fourth embodiments of the present invention.

In a case where the present invention is applied to the aforesaid storage medium, the storage medium stores program codes corresponding to the flowcharts described in the embodiments. Briefly, the storage medium stores each module shown as an example of a memory map in FIG. 24.

The present invention is not limited to the above embodiments and various changes and modifications can be made within the spirit and scope of the present invention. Therefore to apprise the public of the scope of the present invention, the following claims are made.

What is claimed is:

1. An original size sensing apparatus incorporated into an apparatus which comprises a photoelectric converter for reading an image of an original placed on a platen, and a light source for irradiating the original with light, comprising:

an ambient light determination unit for determining the presence/absence of incidence of ambient light on the basis of an output from said photoelectric converter while said light source is kept off; and an original size determination unit for determining, when said ambient light determination unit determines that ambient light is incident, the size of an original placed on said platen on the basis of output from said photoelectric converter except a range in which the ambient light is incident, while said light source is kept on.

2. The apparatus according to claim 1, wherein said ambient light determination unit comprises a binarization processor for comparing a preset threshold value with the output from said photoelectric converter obtained when reading is performed with said light source OFF, and outputting a binary signal indicating the presence/absence of ambient light.

3. The apparatus according to claim 1, further comprising at least one original size sensor for sensing the size in a sub-scan direction of an original placed on said platen, wherein said original size determination unit determines the size of an original placed on said platen on the basis of the output result from said photoelectric converter and the sensing result from said original size sensor.

4. The apparatus according to claim 1, wherein said original size sensing apparatus is applicable to original size sensing in an image reading apparatus, original size sensing in a copying apparatus, and original size sensing in a facsimile apparatus.

5. The apparatus according to claim 1, wherein said original size determination unit determines, when said ambient light determination unit determines that ambient light is not incident, the size of an original placed on said platen on the basis of all the output from said photoelectric converter while said light source is kept on.

6. An original size sensing apparatus incorporated into an apparatus which comprises a photoelectric converter for reading an image of an original placed on a platen having an original size index plate indicating placement position references of various fixed-form originals, and a light source for irradiating the original with light, comprising:

an ambient light determination unit for determining the presence/absence of incidence of ambient light on the basis of an output from said photoelectric converter while said light source is kept off; and an original size determination unit for determining, when said ambient light determination unit determines that ambient light is incident, the size of an original placed on said platen on the basis of output from a range, of said photoelectric converter, from a boundary between a region in which the ambient light is not incident and a region in which the ambient light is incident to a predetermined position, while said light source is kept on.

7. The apparatus according to claim 6, wherein said ambient light determination unit comprises a binarization processor for comparing a preset threshold value with the output from said photoelectric converter obtained when reading is performed with said light source OFF, and outputting a binary signal indicating the presence/absence of ambient light.

8. The apparatus according to claim 6, further comprising at least one original size sensor for sensing the size in a sub-scan direction of an original placed on said platen, wherein said original size determination unit determines the size of an original placed on said platen on the basis of the output result from said photoelectric converter and the sensing result from said original size sensor.

9. The apparatus according to claim 6, wherein said original size sensing apparatus is applicable to original size sensing in an image reading apparatus, original size sensing in a copying apparatus, and original size sensing in a facsimile apparatus.

10. The apparatus according to claim 6, wherein said original size determination unit determines, when said ambient light determination unit determines that ambient light is not incident, the size of an original placed on said platen on the basis of all the output from said photoelectric converter while said light source is kept on.

11. An image reading apparatus which comprises a photoelectric converter for reading an image of an original placed on a platen, and a light source for irradiating the original with light, comprising:
    an ambient light determination unit for determining the presence/absence of incidence of ambient light on the basis of an output from said photoelectric converter while said light source is kept off; and
    an original size determination unit for determining, when said ambient light determination unit determines that ambient light is incident, the size of an original placed on said platen on the basis of output from said photoelectric converter except a range in which the ambient light is incident, while said light source is kept on.

12. An image reading apparatus which comprises a photoelectric converter for reading an image of an original placed on a platen having an original size index plate indicating placement position references of various fixed-form originals, and a light source for irradiating the original with light, comprising:
    an ambient light determination unit for determining the presence/absence of incidence of ambient light on the basis of an output from said photoelectric converter while said light source is kept off; and
    an original size determination unit for determining, when said ambient light determination unit determines that ambient light is incident, the size of an original placed on said platen on the basis of output from a range, of said photoelectric converter, from a boundary between a region in which the ambient light is not incident and a region in which the ambient light is incident to a predetermined position, while said light source is kept on.

13. A copying apparatus which comprises a photoelectric converter for reading an image of an original placed on a platen, and a light source for irradiating the original with light, comprising:
    an ambient light determination unit for determining the presence/absence of incidence of ambient light on the basis of an output from said photoelectric converter while said light source is kept off; and
    an original size determination unit for determining, when said ambient light determination unit determines that ambient light is incident, the size of an original placed on said platen on the basis of output from said photoelectric converter except a range in which the ambient light is incident, while said light source is kept on.

14. A copying apparatus which comprises a photoelectric converter for reading an image of an original placed on a platen having an original size index plate indicating placement position references of various fixed-form originals, and a light source for irradiating the original with light, comprising:
    an ambient light determination unit for determining the presence/absence of incidence of ambient light on the basis of an output from said photoelectric converter while said light source is kept off; and
    an original size determination unit for determining, when said ambient light determination unit determines that ambient light is incident, the size of an original placed on said platen on the basis of output from a range, of said photoelectric converter, from a boundary between a region in which the ambient light is not incident and a region in which the ambient light is incident to a predetermined position, while said light source is kept on.

15. A facsimile apparatus which comprises a photoelectric converter for reading an image of an original placed on a platen, and a light source for irradiating the original with light, comprising:
    an ambient light determination unit for determining the presence/absence of incidence of ambient light on the basis of an output from said photoelectric converter while said light source is kept off; and
    an original size determination unit for determining, when said ambient light determination unit determines that ambient light is incident, the size of an original placed on said platen on the basis of output from said photoelectric converter except a range in which the ambient light is incident, while said light source is kept on.

16. A facsimile apparatus which comprises a photoelectric converter for reading an image of an original placed on a platen having an original size index plate indicating placement position references of various fixed-form originals, and a light source for irradiating the original with light, comprising:
    an ambient light determination unit for determining the presence/absence of incidence of ambient light on the basis of an output from said photoelectric converter while said light source is kept off; and
    an original size determination unit for determining, when said ambient light determination unit determines that ambient light is incident, the size of an original placed on said platen on the basis of output from a range, of said photoelectric converter, from a boundary between a region in which the ambient light is not incident and a region in which the ambient light is incident to a predetermined position, while said light source is kept on.

17. An original size sensing method for an apparatus which comprises a photoelectric converter for reading an image of an original placed on a platen, and a light source for irradiating the original with-light, comprising:

an ambient light determination step of determining the presence/absence of incidence of ambient light on the basis of an output from said photoelectric converter while said light source is kept off; and an original size determination step of determining, when it is determined in said ambient light determination step that ambient light is incident, the size of an original placed on said platen on the basis of output from said photoelectric converter except a range in which the ambient light is incident, while said light source is kept on.

18. An original size sensing method for an apparatus which comprises a photoelectric converter for reading an image of an original placed on a platen having an original size index plate indicating placement position references of various fixed-form originals, and a light source for irradiating the original with light, comprising:

an ambient light determination step of determining the presence/absence of incidence of ambient light on the basis of an output from said photoelectric converter while said light source is kept off; and an original size determination step of determining, when it is determined in said ambient light determination step that ambient light is incident, the size of an original placed on said platen on the basis of output from a range, of said photoelectric converter, from a boundary between a region in which the ambient light is not incident and a region in which the ambient light is incident to a predetermined position, while said light source is kept on.

19. A computer program embodied in a computer readable medium for performing the steps of original size sensing in an apparatus which comprises a photoelectric converter for reading an image of an original placed on the platen, and a light source for irradiating the original with light, said program including:

first computer readable program code means for determining the presence/absence of incidence of ambient light on the basis of an output from said photoeletric converter while said light source is keep off; and second computer readable program code means for determining, when ambient light is found to be incident, the size of an original placed on said platen on the basis of output from said photoelectric converter except a range in which the ambient light is incident, while said light source is kept on.

20. A computer program embodied in a computer readable medium for performing the steps of original size sensing in an apparatus which comprises a photoelectric converter for reading an image of an original placed on the platen having an original size index plate indicating placement position references of various fixed-form originals, and a light source for irradiating the original with light, said program including:

first computer redable code means for determining the presence/absence of incidence of ambient light on the basis of an output from said photoeletric converter while said light source is keep off; and second computer readable code means for determining, when ambient light is found to be incident, the size of an original placed on said platen on the basis of output from a range, of said photoelectric converter, from a boundary between a region in which the ambient light is incident and a region in which the ambient light is incident to a predetermined position, while said light source is ket on.

\* \* \* \* \*